United States Patent
Jeon

(10) Patent No.: US 12,204,779 B2
(45) Date of Patent: *Jan. 21, 2025

(54) STORAGE SYSTEM AND METHOD OF OPERATING THE SAME

(71) Applicant: SK hynix Inc., Gyeonggi-do (KR)

(72) Inventor: Yong Tae Jeon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,241

(22) Filed: May 12, 2023

(65) Prior Publication Data

US 2023/0280917 A1    Sep. 7, 2023

Related U.S. Application Data

(63) Continuation of application No. 17/574,266, filed on Jan. 12, 2022, now Pat. No. 11,782,616.

(30) Foreign Application Priority Data

Apr. 6, 2021 (KR) .......................... 10-2021-0044873
Apr. 13, 2021 (KR) .......................... 10-2021-0048090

(51) Int. Cl.
*G06F 3/06* (2006.01)

(52) U.S. Cl.
CPC .......... *G06F 3/0631* (2013.01); *G06F 3/0614* (2013.01); *G06F 3/065* (2013.01); *G06F 3/0689* (2013.01)

(58) Field of Classification Search
CPC ....................................................... G06F 3/06
See application file for complete search history.

(56) References Cited

U.S. PATENT DOCUMENTS 10,097,636 B1 * 10/2018 Maroney ................. G06F 13/28
10,162,793 B1 * 12/2018 Bshara .................... H04L 69/16
(Continued)

FOREIGN PATENT DOCUMENTS

| KR | 10-2014-0067404 A | 6/2014 |
| KR | 10-2015-0121502 A | 10/2015 |
| KR | 10-2020-0017363 A | 2/2020 |

OTHER PUBLICATIONS

Notice of Allowance for the Korean Patent Application No. 10-2021-0044873 issued by the Korean Patent Office on Jul. 6, 2023.

(Continued)

*Primary Examiner* — Khoa D Doan
(74) *Attorney, Agent, or Firm* — IP & T GROUP LLP

(57) ABSTRACT

A storage system includes a master storage device for storing data based on a RAID level determined by a host, a slave storage device for storing the data according to a command distributed from the master storage device, and a controller hub for coupling the slave storage device to the master storage device, wherein the master storage device is further configured to transfer the command to the slave storage device through the controller hub when the master storage device receives a command processing request from the host, transmit a complete queue (CQ) to the host when operations of the master storage device and the slave storage device are completed in response to the command processing request, and request a host to allocate a capacity to each function in the master storage device and the at least one of the plurality of slave storage devices based on a reference capacity.

17 Claims, 19 Drawing Sheets

(56) References Cited

U.S. PATENT DOCUMENTS

| | | | |
|---|---|---|---|
| 11,175,984 B1 | 11/2021 | Lercari et al. | |
| 2004/0123002 A1* | 6/2004 | Bennett | G06F 13/102 710/74 |
| 2006/0224851 A1* | 10/2006 | Tamura | G06F 3/0605 711/170 |
| 2008/0034147 A1 | 2/2008 | Stubbs et al. | |
| 2011/0179219 A1 | 7/2011 | Ma et al. | |
| 2013/0246726 A1 | 9/2013 | Kirstenpfad et al. | |
| 2014/0281169 A1 | 9/2014 | Mehrotra et al. | |
| 2015/0301749 A1* | 10/2015 | Seo | G06F 3/0619 714/6.24 |
| 2016/0110111 A1 | 4/2016 | Song et al. | |
| 2017/0337069 A1 | 11/2017 | Huang et al. | |
| 2018/0074757 A1 | 3/2018 | Yamaguchi et al. | |
| 2018/0300265 A1* | 10/2018 | Roberts | G11C 5/02 |
| 2019/0034306 A1* | 1/2019 | Wysocki | G06F 11/2094 |
| 2020/0073840 A1 | 3/2020 | Mekad et al. | |
| 2020/0081650 A1* | 3/2020 | Herrell | G06F 3/0658 |
| 2021/0042255 A1 | 2/2021 | Colenbrander | |
| 2021/0216388 A1 | 7/2021 | Kumar et al. | |

OTHER PUBLICATIONS

Office Action for the U.S. Appl. No. 17/481,503 issued by the USPTO on Aug. 23, 2023.
Office Action for U.S. Appl. No. 17/483,179 issued by the USPTO on Sep. 25, 2024.

* cited by examiner

STORAGE SYSTEM AND METHOD OF OPERATING THE SAME

CROSS-REFERENCE TO RELATED APPLICATION

This application is a continuation of U.S. patent application Ser. No. 17/574,266 filed on Jan. 12, 2022, which claims priority under 35 U.S.C. § 119 (a) to Korean patent application number 10-2021-0048090, filed on Apr. 13, 2021, and Korean patent application number 10-2021-0044873, filed on Apr. 6, 2021. The disclosure of each of foregoing application is incorporated herein by reference in their entirety.

BACKGROUND

Field of Invention

Various embodiments of the present invention generally relate to an electronic device, and more particularly, to a PCIe interface device, a storage system and operating methods thereof.

Description of Related Art

Peripheral Component Interconnect Express (PCIe) is an interface having a serial architecture for data communication. A PCIe-based storage device may support a multi-port and a multi-function. The PCIe-based storage device may be virtualized or non-virtualized, and may achieve Quality of Service (QOS) of a host input/output (I/O) command through one or more PCIe functions.

A storage device may store data in response to control of a host device such as a computer or a smartphone. A storage device may include a memory device storing data and a memory controller controlling the memory device. Generally, there are two types of memory devices: volatile memory devices and nonvolatile memory devices.

Volatile memory devices may store data only when power is supplied thereto, and may lose data stored therein when power is not supplied. Examples of the volatile memory devices include a Static Random Access Memory (SRAM) device and a Dynamic Random Access Memory (DRAM) device.

Nonvolatile memory devices may retain stored data even when supply of power is interrupted or blocked. Examples of nonvolatile memory devices include a Read Only Memory (ROM) device, a Programmable ROM (PROM) device, an Electrically Programmable ROM (EPROM) device, an Electrically Erasable and Programmable ROM (EEPROM) device, and a flash memory device.

A Redundant Array of Independent Disks (RAID) is a technology that distributes and stores data across a plurality of hard disks, and is also referred to as a disk array. The RAID includes various schemes of distributing and storing data depending on a level. Reliability of a storage device may be increased or entire performance of the storage device may be improved depending on the level.

The storage device may store data in response to control of a host device such as a computer or a smartphone. The storage device may include a memory device storing data and a memory controller controlling the memory device. Generally, there are two types of memory devices: volatile memory devices and nonvolatile memory devices.

Volatile memory devices may store data only when power is supplied thereto, and may lose data stored therein when power is not supplied. Examples of volatile memory devices include a Static Random Access Memory (SRAM) device, a Dynamic Random Access Memory (DRAM) device, and the like.

Nonvolatile memory devices may retain stored data even when the supply of power is interrupted or blocked. Examples of nonvolatile memory devices include a Read Only Memory (ROM) device, a Programmable ROM (PROM) device, an Electrically Programmable ROM (EPROM) device, an Electrically Erasable and Programmable ROM (EEPROM) device, a flash memory device, and the like.

SUMMARY

Various embodiments of the present disclosure are directed to a Peripheral Component Interconnect Express (PCIe) interface device in which a Redundant Array of Independent Disks (RAID)-couples solid-state drives (SSDs) having different capacities and a method of operating the PCIe interface device.

According to an embodiment of the present disclosure, a Peripheral Component Interconnect Express (PCIe) interface device may include a root complex configured to support a PCIe port which is a root port that could be coupled to an input/output (I/O) device, a plurality of endpoints each coupled to the root complex through a link, and a Redundant Array of Independent Disks (RAID) controller configured to control RAID-coupling of a plurality of storage devices that are respectively coupled to the plurality of endpoints, wherein the RAID controller is further configured to request a host to allocate a capacity to each function in the plurality of storage devices based on a reference capacity.

According to an embodiment of the present disclosure, a method of operating a Peripheral Component Interconnect Express (PCIe) interface device, which includes a Redundant Array of Independent Disks (RAID) controller that controls RAID-coupling of a plurality of storage devices, may include receiving, from the plurality of storage devices, pieces of size information indicating capacities of the respective storage devices, setting a reference capacity based on the pieces of size information, and requesting a host to allocate a capacity to each function in the plurality of disks based on the reference capacity.

According to an embodiment of the present disclosure, an operating method of a system including a host, a Peripheral Component Interconnect Express (PCIe) interface device and plural storage devices may include identifying, by the PCIe interface device, a total capacity of each of the storage devices, determining, by the PCIe interface device, a reference capacity based on the total capacities, determining, by the PCIe interface device, a number of functions to be allocated to the storage devices based on the reference capacity, allocating, by the host, the determined number of functions to the storage devices, dividing, by each of the storage devices, the total capacity into one or more units of the reference capacity; allocating, by each of the storage devices, the divided units to the respective functions allocated thereto, and RAID-coupling, by the PCIe interface device, the storage devices.

Various embodiments of the present disclosure are directed to a storage system capable of storing data according to a RAID method without a separate RAID controller included therein and a method of operating the storage system.

According to an embodiment of the present disclosure, a storage system may include a master storage device configured to store data based on a RAID level determined by a host, a slave storage device configured to store the data according to a command distributed from the master storage device, and a controller hub configured to couple the slave storage device to the master storage device, wherein the master storage device is further configured to transfer the command to the slave storage device through the controller hub when the master storage device receives a command processing request from the host, and to transmit a complete queue (CQ) to the host when operations of the master storage device and the slave storage device are completed in response to the command processing request.

According to an embodiment of the present disclosure, a method of operating a storage system, which includes a master storage device, a slave storage device, and a controller hub coupling the master storage device to the slave storage device, may include receiving, by the master storage device, a command processing request from a host, distributing, by the master storage device, the command processing request through the controller hub according to a predetermined Redundant Array of Independent Disks (RAID) level, performing, by the master and slave storage devices, an operation corresponding to the command processing request, and transmitting, by the master storage device, a complete queue (CQ) to the host, when the operation is completed.

According to an embodiment of the present disclosure, an operating method of a storage device, which may include distributing a Redundant Array of Independent Disks (RAID) request from a host to one or more slave storage devices through a hub while performing a RAID operation in response to the RAID request and transmitting a complete queue (CQ) to the host upon receiving responses from the slave storage devices, the responses indicating completion of the RAID operations by the respective slave storage devices in response to the RAID request.

According to an embodiment of the present disclosure, a storage system may include a master storage device configured to store data based on a RAID level determined by a host, a slave storage device configured to store the data according to a command distributed from the master storage device, and a controller hub configured to couple the slave storage device to the master storage device, wherein the master storage device is further configured to transfer the command to the slave storage device through the controller hub when the master storage device receives a command processing request from the host, to transmit a complete queue (CQ) to the host when operations of the master storage device and the slave storage device are completed in response to the command processing request, and to request a host to allocate a capacity to each function in the master storage device and the slave storage device based on a reference capacity.

According to an embodiment of the present disclosure, a storage system may include a master storage device configured to store data based on a RAID level determined by a host, a plurality of slave storage devices, each of the plurality of slave devices being configured to store the data according to a command distributed from the master storage device, and a controller hub configured to couple the slave storage device to the master storage device, wherein the master storage device is further configured to transfer the command to at least one of the plurality of slave storage devices through the controller hub when the master storage device receives a command processing request from the host, to transmit a complete queue (CQ) to the host when operations of the master storage device and the at least one of the plurality of slave storage devices are completed in response to the command processing request, and to request a host to allocate a capacity to each function in the master storage device and the at least one of the plurality of slave storage devices based on a reference capacity.

DETAILED DESCRIPTION

Specific structural and functional features of the present disclosure are disclosed in the context of the following embodiments of the present disclosure. However, the present disclosure may be configured, arranged, or carried out differently than disclosed herein. Thus, the present disclosure is not limited to any particular embodiment nor to any specific details. Also, throughout the specification, reference to "an embodiment," "another embodiment" or the like is not necessarily to only one embodiment, and different references to any such phrase are not necessarily to the same embodiment. Moreover, the use of an indefinite article (i.e., "a" or "an") means one or more, unless it is clear that only one is intended. Similarly, terms "comprising," "including," "having" and the like, when used herein, do not preclude the existence or addition of one or more other elements in addition to the stated element(s).

It should be understood that the drawings are simplified schematic illustrations of the described devices and may not include well-known details for avoiding obscuring the features of the invention.

It should also be noted that features present in one embodiment may be used with one or more features of another embodiment without departing from the scope of the invention.

It is further noted, that in the various drawings, like reference numbers designate like elements.

The present disclosure describes two main embodiments, and each main embodiment includes a plurality of embodiments. The main embodiments may be described in detail through FIGS. 1 to 11, and FIGS. 12 to 22, respectively. As used herein, the terms "storage device", "memory system", "storage medium" and "data storage apparatus" are used interchangeably.

1. RAID-Coupling of the Plurality of Storage Devices Having Different Capacities FIG. 1 is a block diagram illustrating a Peripheral Component Interconnect Express (PCIe) interface device 100 according to an embodiment of the present disclosure.

Figure 1:
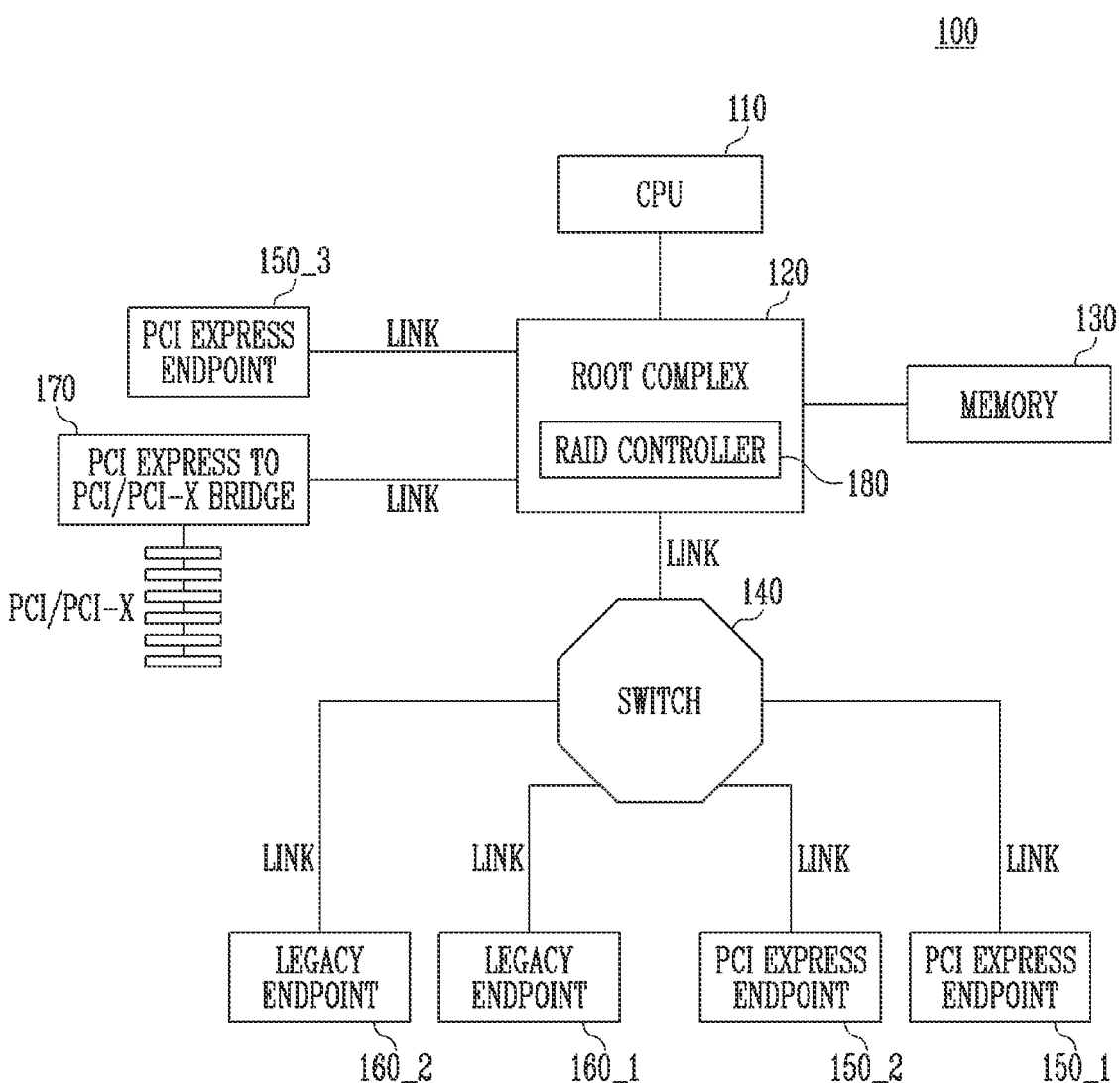
FIG. 1 is a block diagram illustrating a Peripheral Component Interconnect Express (PCIe) interface device according to an embodiment of the present disclosure.

Referring to FIG. 1, the PCIe interface device 100 may include a central processing unit (CPU) 110, a root complex 120, memory 130, a switch 140, PCIe endpoints 150_1, 150_2, and 150_3, legacy endpoints 160_1 and 160_2, and a PCIe bridge 170.

In an embodiment shown in FIG. 1, the root complex 120 may be coupled to each of the switch 140, the PCIe endpoint 150_3, and the PCIe bridge 170 through respective links LINK. In addition, the switch 140 may be coupled to each of the PCIe endpoints 150_1 and 150_2 and the legacy endpoints 160_1 and 160_2 through respective links LINK. The link LINK may include at least one lane.

According to an embodiment, the root complex 120 may couple the CPU 110 and the memory 130 to an input/output (I/O) hierarchy.

More specifically, the root complex 120 may support a PCIe port. In other words, the root complex 120 may support a root port that could be coupled to an input/output (I/O) device.

In addition, the root complex 120 may support routing between layers of respective components included in the PCIe interface device 100. The routing may refer to an operation of selecting a path from a transmission side to a receiving side in data communication. The routing may be performed by one of a method of presetting a path from the transmission side to the receiving side or a method of selecting the most efficient path depending on a state of a system or a network.

In addition, the root complex 120 may support an input/output (I/O) request. The root complex 120 must support generation of a configuration request. However, as a completer, the root complex 120 must not support lock semantics. As a requester, the root complex 120 may request generation of a lock request.

According to an embodiment, the root complex 120 may divide a packet transmitted between layers into smaller units during routing. In addition, the root complex 120 may generate the I/O request.

According to one embodiment, the root complex 120 may include a Redundant Array of Independent Disks (RAID) controller 180 for RAID-coupling a plurality of storage devices respectively coupled to the PCIe endpoints 150_1, 150_2, and 150_3 or respectively coupled to the legacy endpoints 160_1 and 160_2. In this disclosure, to "RAID-couple entities" may mean to couple the entities so that the entities operate according to the RAID scheme. According to another embodiment which is not shown, the RAID controller 180 may be disposed external to the root complex 120 and may be coupled to the CPU 110 and the memory 130.

Methods of RAID-coupling a plurality of storage devices may include a hardware-wise method and a software-wise method.

More specifically, the hardware-wise method may include a method in which the RAID controller 180 is included in the PCIe interface device 100. The RAID controller 180 may control the plurality of storage devices coupled by the links to operate as a single logical storage device. The software-wise method may be implemented using a RAID function of an operating system, and may show a user the plurality of storage devices as if the plurality of storage devices are a single storage device.

According to an embodiment, the switch 140 may include two or more logical PCI-to-PCI bridges. Each of the two or more logical PCI-to-PCI bridges may be coupled to an upstream port or a downstream port.

The switch 140 may transmit a transaction using a PCI bridge mechanism, i.e., an address-based multicasting method. The switch 140 must be able to transmit all types of transaction layer packets (TLPs) through an upstream port and a downstream port. In addition, the switch 140 must support a locked request. Each port of the enabled switch 140 must be able to support flow control. When contention occurs in the same virtual channel, the switch 140 may arbitrate the contention by applying a round robin scheme or a weighted round robin scheme.

According to an embodiment, unlike the root complex 120, the switch 140 might not divide a packet transmitted between layers into smaller units.

According to an embodiment, the PCIe endpoints 150_1, 150_2, and 150_3 and the legacy endpoints 160_1 and 160_2 may serve as a requester or a completer of a PCIe transaction. A TLP transmitted and received by the PCIe endpoints 150_1, 150_2, and 150_3 and the legacy endpoints 160_1 and 160_2 must provide a configuration space header. In addition, the PCIe endpoints 150_1, 150_2, and 150_3 and the legacy endpoints 160_1 and 160_2 must provide a configuration request as the completer.

According to an embodiment, the PCIe endpoints 150_1, 150_2, and 150_3 and the legacy endpoints 160_1 and 160_2 may be classified according to a size of a memory transaction. For example, the PCIe endpoints 150_1, 150_2, and 150_3 may handle a memory transaction exceeding 4 GB and the legacy endpoints 160_1 and 160_2 may handle a memory transaction under 4 GB. The PCIe endpoints 150_1, 150_2, and 150_3 must not generate an input/output (I/O) request, whereas the legacy endpoints 160_1 and 160_2 may provide or generate an I/O request.

According to an embodiment, the PCIe endpoint 150_3 may transmit or receive a TLP to or from the root complex 120. In addition, Peripheral Component Interconnect/Peripheral Component Interconnect extended (PCI/PCI-X) may transmit or receive a TLP to or from the root complex 120 through the PCIe bridge 170. The PCIe endpoints 150_1 and 150_2 or the legacy endpoints 160_1 and 160_2 may transmit or receive a TLP to or from the switch 140.

According to an embodiment, the switch 140 may transmit the TLP received from the PCIe endpoints 150_1 and 150_2 or the legacy endpoints 160_1 and 160_2 to the root complex 120. The switch 140 may transfer the TLP received from the root complex 120 to the PCIe endpoint 150_3 or the PCI/PCI-X.

According to an embodiment, the root complex 120 may directly transmit or receive a TLP to or from the PCIe endpoint 150_3. The root complex 120 may transmit or receive a TLP to or from the PCIe endpoints 150_1 and 150_2 or the legacy endpoints 160_1 and 160_2 through the switch 140. According to an embodiment, the root complex 120 may transmit the TLP received from the PCIe endpoints 150_1, 150_2, and 150_3 or the legacy endpoints 160_1 and 160_2 to the CPU 110 or the memory 130.

Figure 2:
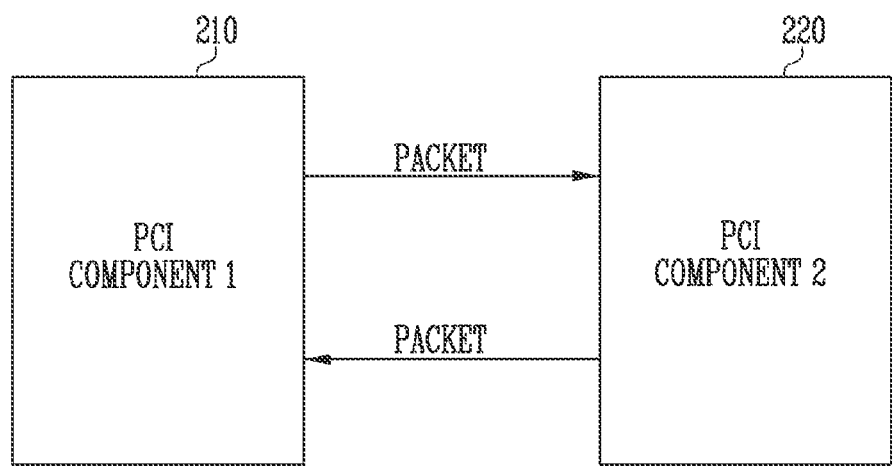
FIG. 2 is a diagram illustrating transmission of packets between components included in a PCIe interface device according to an embodiment of the present disclosure.

FIG. 2 is a diagram illustrating transmission of packets between components included in the PCIe interface device 100 according to an embodiment of the present disclosure.

Referring to FIGS. 1 and 2, each of PCI components 210 and 220 may be one of the root complex 120, the switch 140, the PCIe endpoints 150_1, 150_2, and 150_3, the legacy endpoints 160_1 and 160_2, and the PCIe bridge 170 shown in FIG. 1. In other words, each of the PCI components 210 and 220 shown in FIG. 2 may be one of the components coupled by the links LINK. The link LINK may include at least one lane.

According to an embodiment, the PCI components 210 and 220 may transmit or receive a packet PACKET through the link LINK. In other words, each of the PCI components 210 and 220 may serve as a transmitter TX transmitting the packet PACKET or a receiver RX receiving the packet PACKET.

According to an embodiment, the packet PACKET may be a unit of information transmission and may include an optional TLP prefix, header, and data payload.

According to an embodiment, latency may be reduced by not snooping the packet PACKET that needs not to be cached. When transaction dependencies do not arise, packet PACKET operational performance may be improved by changing ordering. In addition, the packet PACKET operational performance may also be improved by changing ordering based on ID.

Figure 3:
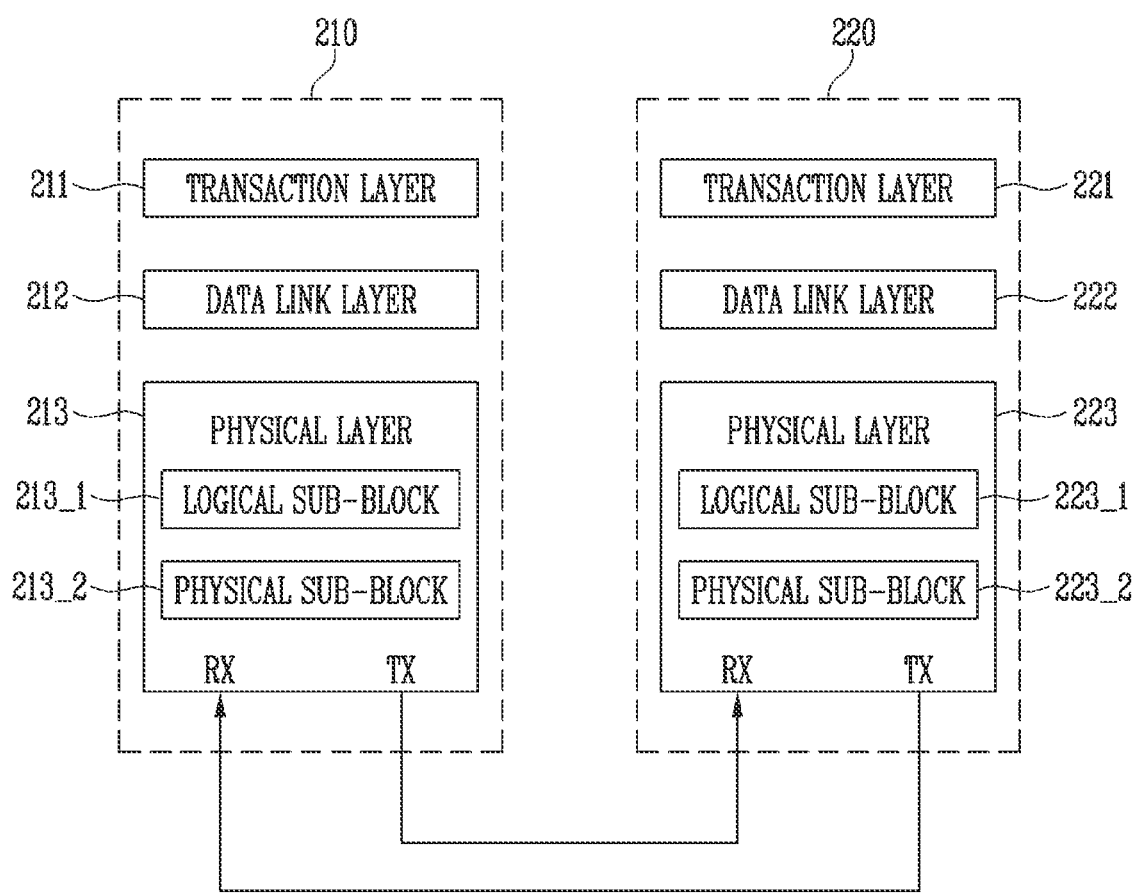
FIG. 3 is a diagram illustrating layers included in each of components included in a PCIe interface device according to an embodiment of the present disclosure.

FIG. 3 is a diagram illustrating layers included in each of components included in the PCIe interface device 100 according to an embodiment of the present disclosure.

Referring to FIGS. 2 and 3, FIG. 3 illustrates layers included in each of the PCI components 210 and 220 shown in FIG. 2. In FIG. 3, each of the PCI components 210 and 220 may include a transaction layer 211, 221, a data link layer 212, 222, and a physical layer 213, 223. The physical layer 213, 223 may include a logical sub-block 213_1, 223_1 and a physical sub-block 213_2, 223_2.

According to an embodiment, the transaction layer 211, 221 may combine or decompose a transaction layer packet (TLP). The TLP may be used for processing a transaction of read or write, that is, a particular event.

The transaction layer 211, 221 may control a credit-based flow. In addition, the transaction layer 211, 221 may support various formats of addressing depending on a transaction type. For example, the transaction layer 211, 221 may support addressing with respect to memory, input/output, configuration, or a message.

According to an embodiment, the transaction layer 211, 221 may perform a function of initialization and configuration. More specifically, the transaction layer 211, 221 may store link setting information generated by a processor or a management device. In addition, the transaction layer 211, 221 may store link attributes related to a bandwidth and a frequency determined by the physical layer 213, 223.

According to an embodiment, the transaction layer 211, 221 may generate and process a packet. More specifically, the transaction layer 211, 221 may generate a TLP requested by a device core and may translate a received TLP into data payload or status information. In addition, when the transaction layer 211, 221 supports End-to-End data integrity, the transaction layer 211, 221 may generate and update a cyclic redundancy check (CRC) code to a header of the TLP.

According to an embodiment, the transaction layer 211, 221 may control a flow. More specifically, the transaction layer 211, 221 may track flow control credit with respect to a TLP in the link. In addition, the transaction layer 211, 221 may periodically receive a state of transaction credit through the data link layer 212, 222. The transaction layer 211, 221 may control TLP transmission based on flow control information.

According to an embodiment, the transaction layer 211, 221 may manage power. More specifically, the transaction layer 211, 221 may manage power according to instructions of system software. In addition, the transaction layer 211, 221 may autonomously manage power according to instructions of hardware when power is supplied.

According to an embodiment, the transaction layer 211, 221 may identify a virtual channel mechanism and a traffic class for a particular class of an application. The transaction layer 211, 221 may provide an independent logical data flow through a particular physical resource. In addition, the transaction layer 211, 221 may apply an appropriate service policy in a manner of providing different ordering through packet labelling.

According to an embodiment, the data link layer 212, 222 may take charge of link management, data integrity, error detection, and error correction. The data link layer 212, 222 may assign a data protection code and a TLP sequence number to a TLP to be transmitted and transmit the TLP to the physical layer 213, 223. In addition, the data link layer 212, 222 may check integrity of a TLP received from the physical layer 213, 223 and transmit the integrity of the TLP to the transaction layer 211, 221.

When the data link layer 212, 222 detects an error in a TLP, the data link layer 212, 222 may request retransmission of a TLP from the physical layer 213, 223 until a TLP without an error is received or it is determined that a link is in a fail state. The data link layer 212, 222 may generate and consume a data link layer packet (DLLP) used for link management.

According to an embodiment, the data link layer 212, 222 may exchange reliable information. In addition, the data link layer 212, 222 may manage initialization and power. More specifically, the data link layer 212, 222 may transmit a power status request from the transaction layer 211, 221 to the physical layer 213, 223. In addition, the data link layer 212, 222 may transmit information on activation or inactivation, reset, disconnection, and power management status to the transaction layer 211, 221.

According to an embodiment, the data link layer 212, 222 may perform data protection, an error check, and a retry. More specifically, the data link layer 212, 222 may generate a CRC code for data protection. In addition, the data link layer 212, 222 may store a TLP such that a retry may be performed with respect to a transmitted TLP. The data link layer 212, 222 may check a TLP, transmit a retry message, and indicate an error for an error report and logging.

According to an embodiment, the physical layer 213, 223 may include components for an interface operation, such as a driver, an input buffer, a parallel-to-serial or serial-to-parallel convertor, and/or a phase-locked loop (PLL).

According to an embodiment, the physical layer 213, 223 may convert a packet received from the data link layer 212, 222 into a serialized format and transmit the converted packet. In addition, the physical layer 213, 223 may set a bandwidth and a frequency according to compatibility with a device coupled to an end of a link opposite to an end to which the physical layer 213, 223 is coupled. For serial communication of data, the physical layer 213, 223 may serialize or deserialize a packet. In other words, the physical layer 213, 223 may serve as a serializer or a deserializer.

According to an embodiment, the physical layer 213, 223 may perform initialization, maintenance, and status detection of an interface. More specifically, the physical layer 213, 223 may manage power due to coupling among the components. In addition, the physical layer 213, 223 may negotiate bandwidths and lane mapping among the components, and may reverse polarity of a lane.

The physical layer 213, 223 may generate a symbol and a special ordered set. In addition, the physical layer 213, 223 may transmit and align the generated symbol.

According to an embodiment, the physical layer 213, 223 may serve as a transmitter or a receiver of a packet between PCI components. In other words, the physical layer 213, 223 may convert a packet received through the transaction layer 211, 221 and the data link layer 212, 222 to transmit the converted packet to PCI components other than a PCI component in which the physical layer 213, 223 is included, and convert a packet received from the PCI components other than the PCI component in which the physical layer 213, 223 is included to transmit the converted packet to the transaction layer 211, 221 through the data link layer 212, 222.

According to an embodiment, the logical sub-block 213_1, 223_1 included in the physical layer 213, 223 may have two sections. One of the two sections may be a transmission section which prepares transmission of information transmitted from the data link layer 212, 222 to the physical sub-block 213_2, 223_2. The other of the two sections may be a reception section which identifies information and prepares output of the information to the data link layer 212, 222 before outputting the information to the data link layer 212, 222.

According to an embodiment, the physical sub-blocks 213_2 and 223_2 included in the physical layers 213 and 223, respectively, may be electrical sub-blocks which are able to support an independent reference clock structure in common or independently. In addition, the physical sub-block 213_2, 223_2 may reduce a swing for a low-power link operation, detect a receiver within a band, and detect an electrical idle state.

Figure 4:
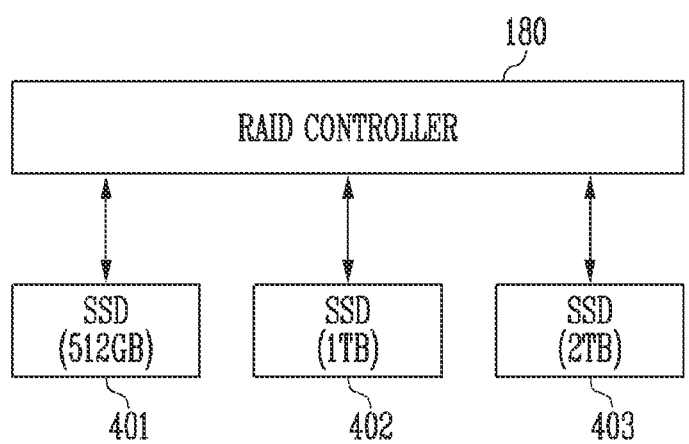
FIG. 4 is a diagram illustrating coupling of a plurality of solid-state drives (SSDs) having different capacities according to an embodiment of the present disclosure.

FIG. 4 is a diagram illustrating coupling of a plurality of solid-state drives (SSDs) having different capacities according to an embodiment of the present disclosure.

Referring to FIGS. 1 and 4, FIG. 4 illustrates a plurality of storage devices 401, 402, and 403 coupled to the RAID controller 180 through the links LINK shown in FIG. 1. Each of the plurality of storage devices 401, 402, and 403 may be a solid-state drive (SSD) or a hard disk drive (HDD). By way of example, all of the plurality of storage devices 401, 402, and 403 shown in FIG. 4 are solid-state drives (SSDs) in the context of the following description.

According to an embodiment shown in FIG. 4, the number of the plurality of storage devices 401, 402, and 403 coupled to the RAID controller 180 is three in total, and capacities of the plurality of storage devices 401, 402, and 403 may be 512 GB, 1 TB, and 2 TB, respectively. According to another embodiment, less or more than three storage devices may be coupled to the RAID controller 180. In addition, capacities of the storage devices coupled to the RAID controller 180 may be the same or different.

According to an embodiment, when the capacities of the plurality of storage devices 401, 402, and 403 are different, the plurality of storage devices 401, 402, and 403 may be RAID-coupled together. When the plurality of storage devices 401, 402, and 403 having different capacities are RAID-coupled together, an available capacity of each of the plurality of storage devices 401, 402, and 403 may depend on the smallest capacity among the capacities of the plurality of storage devices 401, 402, and 403.

For example, the capacity of the storage device (SSD) 401 which is the smallest among the capacities of the plurality of storage devices 401, 402, and 403 may be 512 GB. The available capacities of the plurality of storage devices 401, 402, and 403 may depend on the capacity of the storage device (SSD) 401 which is the smallest capacity. Accordingly, although the capacity of the storage device (SSD) 402 is 1 TB and the capacity of the storage device (SSD) 403 is 2 TB, only the capacity of 512 GB may be available in each of the storage devices (SSDs) 402 and 403.

As a result, the available capacity of each of the storage devices (SSDs) 402 and 403 depends on the capacity of the storage device (SSD) 401, and therefore a remaining capacity of each of the storage devices (SSDs) 402 and 403 except for the available capacity might not be utilized during the RAID-coupling.

Further, when the plurality of storage devices 401, 402, and 403 having different capacities are RAID-coupled together, operating speeds of the plurality of storage devices 401, 402, and 403 may depend on the lowest operating speed among the operating speeds of the plurality of storage devices 401, 402, and 403. Generally, an operating speed of a storage device having the smallest capacity is the lowest, and therefore the operating speeds of the plurality of storage devices 401, 402, and 403 may depend on the operating speed of the storage device having the smallest capacity.

Accordingly, in order to prevent or mitigate the available capacities and the operating speeds of the plurality of storage devices 401, 402, and 403 from depending on the capacity and the operating speed of the storage device having the smallest capacity, the present disclosure provides a method of RAID-coupling the plurality of storage devices 401, 402, and 403 having different capacities by allocating capacities to respective functions of the plurality of storage devices 401, 402, and 403 based on the greatest common divisor of the capacities of the plurality of storage devices 401, 402, and 403. The function may refer to a physical function (PF) between the physical function (PF) and a virtual function (VF). The PF and the VF are functions supported by the PCIe interface device 100, the PF means a physical device, and a plurality of virtual devices may be generated per PF. Accordingly, a plurality of VFs may be generated to each PF, and respective PFs may support different numbers of VFs.

Further, according to the present disclosure, an unavailable capacity of each of storage devices having different capacities may be minimized while using conventional RAID-coupling methods (i.e., the conventional RAID schemes RAID 0 to 6).

Figure 5:
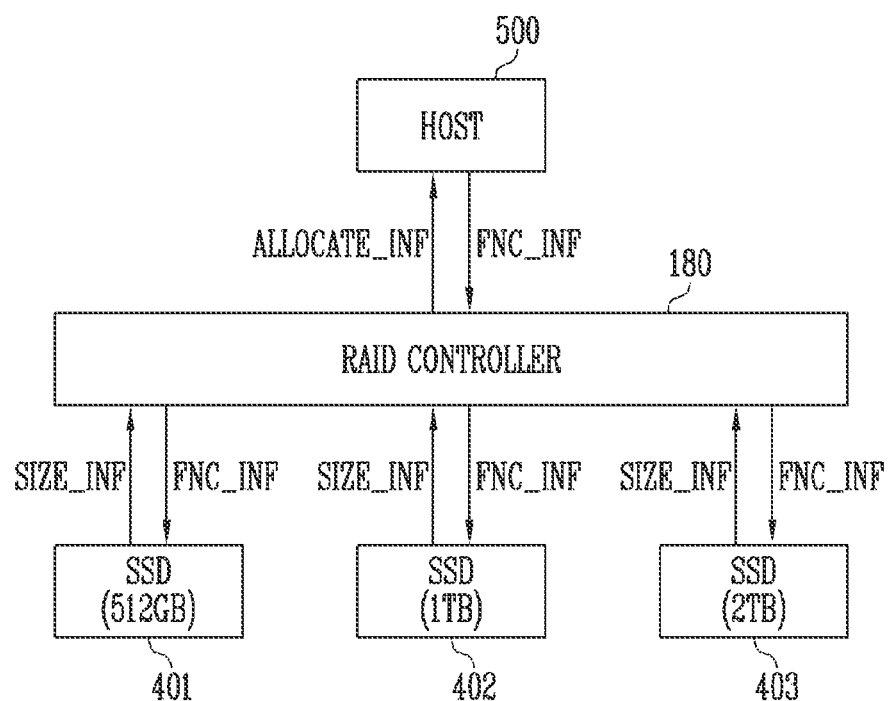
FIG. 5 is a diagram illustrating a process of allocating capacities to respective functions when a plurality of SSDs having different capacities are coupled according to an embodiment of the present disclosure.

FIG. 5 is a diagram illustrating a process of allocating capacities to respective functions when a plurality of SSDs having different capacities are coupled according to an embodiment of the present disclosure.

Referring to FIGS. 4 and 5, FIG. 5 illustrates an initialization operation for RAID-coupling the plurality of storage devices 401, 402, and 403 having different capacities. By way of example, the plurality of storage devices 401, 402, and 403 shown in FIG. 5 are the same as the plurality of storage devices 401, 402, and 403 shown in FIG. 4 in the context of the following description.

According to an embodiment described with reference to FIG. 5, a method in which the RAID controller 180 allocates capacities to respective functions allocated to each of the storage devices 401 to 403 based on size information SIZE_INF received from each storage device, that is, the hardware-wise method is described. However, according to another embodiment, the present disclosure may be applied in a manner of allocating capacities to respective functions using a RAID function of an operating system, that is, the software-wise method.

According to an embodiment, before the plurality of storage devices 401, 402, and 403 are RAID-coupled together, entire data of the plurality of storage devices 401, 402, and 403 may be deleted.

When the entire data of the plurality of storage devices 401, 402, and 403 is deleted, the RAID controller 180 may receive, from the storage devices 401 to 403, the size information SIZE_INF of each of the plurality of storage devices 401, 402, and 403 to be RAID-coupled together. Accordingly, the RAID controller 180 may identify a capacity of the storage device (SSD) 401 as 512 GB, a capacity of the storage device (SSD) 402 as 1 TB, and a capacity of the storage device (SSD) 403 as 2 TB based on the size information SIZE_INF.

According to an embodiment, after the RAID controller 180 identifies the capacities of each of the plurality of storage devices 401, 402, and 403, the RAID controller 180 may provide a host 500 with allocation information ALLOCATE_INF representing a number of functions to be allocated to each of the storage devices 401 to 403. Capacities may be allocated to respective functions allocated to each of the plurality of storage devices 401, 402, and 403 based on the greatest common divisor of the capacities of the plurality of storage devices 401, 402, and 403. The greatest common divisor of the capacities of the plurality of storage devices 401, 402, and 403 may be a reference capacity.

More specifically, because the capacities of the plurality of storage devices 401, 402, and 403 are 512 GB, 1 TB, and 2 TB, respectively, the reference capacity may be 512 GB. Accordingly, the RAID controller 180 may determine a number of functions to be allocated to each storage device based on a capacity of 512 GB per function. For example, the RAID controller 180 may determine a single function to be allocated to the storage device (SSD) 401, two functions to be allocated to the storage device (SSD) 402, and four functions to be allocated to the storage device (SSD) 403. The RAID controller 180 may output, to the host 500, the allocation information ALLOCATE_INF representing the determined number of functions to be allocated to each storage device.

The host 500 may generate, based on the allocation information ALLOCATE_INF received from the RAID controller 180, function information FNC_INF for allocating the determined number of functions to each of the storage devices. The host 500 may provide the function information FNC_INF to the storage devices 401 to 403 through the RAID controller 180 by a predetermined method (for example, a management component transport protocol (MCTP), a vendor specific method, or an NVMe admin command).

More specifically, the host 500 may allocate the determined number of functions to each of the storage devices 401 to 403. The determined number of functions may be provided to the host 500 through the allocation information ALLOCATE_INF. The determined number of functions may be based on the reference capacity of 512 GB. Accordingly, each of the plurality of storage devices 401, 402, and 403 may divide its capacity into one or more units of the reference capacity according to the number of functions allocated thereto through the function information FNC_INF. Each of the storage devices 401 to 403 may allocate the divided units of the reference capacity to the respective functions allocated thereto.

Thereafter, the PCIe interface device may be rebooted. However, when the plurality of storage devices 401, 402, and 403 are not solid-state drives (SSD), the PCIe interface device might not be rebooted.

According to an embodiment, when any storage device that does not support the predetermined method (hereinafter, referred to as a "non-supporting storage device") exist among the plurality of storage devices 401, 402, and 403, the host 500 may allocate a number of functions to each of the plurality of storage devices 401, 402, and 403 based on a capacity of the non-supporting storage device without dividing the capacity of the non-supporting storage device.

A method of allocating the number of functions to storage devices when the non-supporting storage device exists is described in detail below with reference to FIGS. 8 and 9.

Figure 6:
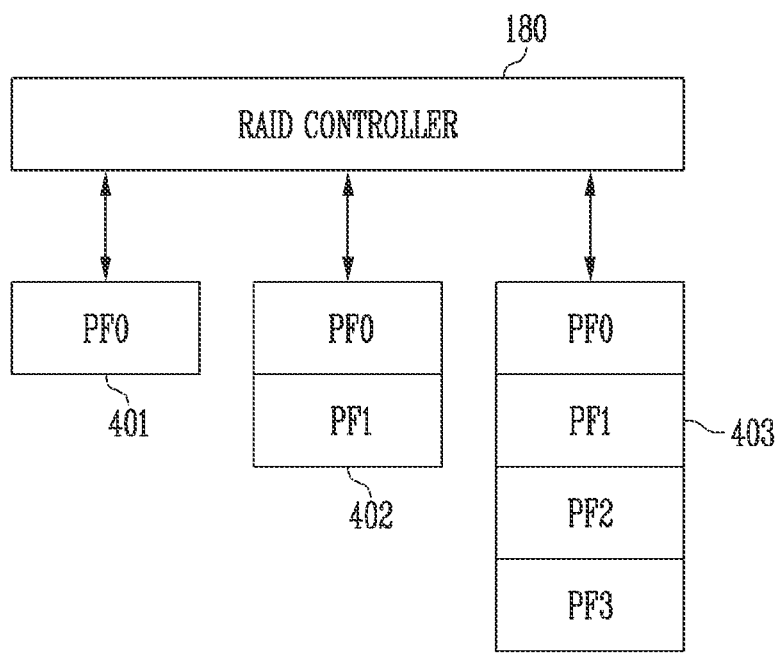
FIG. 6 is a diagram illustrating a method of dividing capacities of SSDs per function according to an embodiment of the present disclosure.

FIG. 6 is a diagram illustrating a method of dividing capacities of SSDs per function according to an embodiment of the present disclosure.

Referring to FIGS. 5 and 6, FIG. 6 illustrates a capacity allocated to each function after each storage device receives the function information FNC_INF from the host 500 as in the embodiment described with reference to FIG. 5.

According to an embodiment, the RAID controller 180 may determine one function to be allocated to the storage device (SSD) 401, two functions to be allocated to the storage device (SSD) 402, and four functions to be allocated to the storage device (SSD) 403 according to the reference capacity.

Accordingly, a single unit of the reference capacity is allocated to one function (PF0) allocated to the storage device (SSD) 401, and the single unit of the reference capacity for the function PF0 may be 512 GB. A capacity of two units of the reference capacity is allocated to two functions (PF0 and PF1) allocated to the storage device (SSD) 402, and the reference capacity for each of the two functions PF0 and the PF1 may be 512 GB. A capacity of four units of the reference capacity is allocated to four functions (PF0, PF1, PF2, and PF3) allocated to the storage device (SSD) 403, and the single unit of the reference capacity for each of the PF0, PF1, PF2, and PF3 may be 512 GB.

As a result, because the reference capacity of 512 GB is allocated to each function allocated to each of the plurality of storage devices 401, 402, and 403, the reference capacity for each of the PF0, PF1, PF2, and PF3 may be 512 GB. In addition, the number of functions may be allocated to each of the plurality of storage devices 401, 402, and 403 in response to the function information FNC_INF. The function information FNC_INF may be determined according to the allocation information ALLOCATE_INF. The allocation information ALLOCATE_INF may be determined according to the reference capacity.

When a capacity is allocated to each function in the plurality of storage devices 401, 402, and 403 in the above-described manner, the plurality of storage devices 401, 402, and 403 having different capacities may be utilized in their entirety. In other words, the plurality of storage devices 401, 402, and 403 having different capacities may be RAID-coupled without depending on a storage device having the smallest capacity among the plurality of storage devices 401, 402, and 403.

Figure 7:
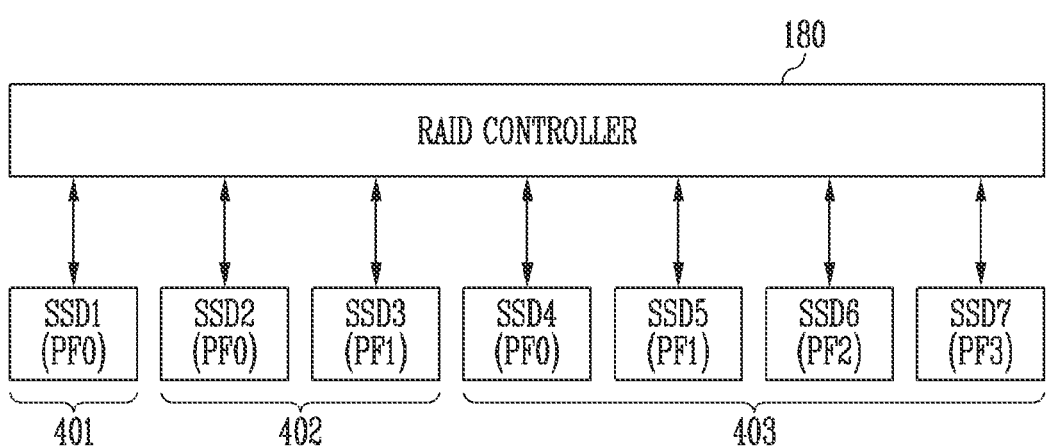
FIG. 7 is a diagram illustrating a RAID operation after allocating capacities to respective functions as shown in FIG. 6 according to an embodiment of the present disclosure.

FIG. 7 is a diagram illustrating a RAID operation after allocating capacities to respective functions as shown in FIG. 6 according to an embodiment of the present disclosure.

Referring to FIGS. 6 and 7, FIG. 7 illustrates a RAID operation after the reference capacity of 512 GB is allocated to each function in the plurality of storage devices 401, 402, and 403 as in the embodiment described with reference to FIG. 6.

According to an embodiment, when the reference capacity is allocated to each function allocated to each of the plurality of storage devices 401, 402, and 403, the RAID controller 180 or the CPU 110 shown in FIG. 1 may recognize each function as one storage device. In other words, the RAID controller 180 or the CPU 110 shown in FIG. 1 may detect and RAID-couple the functions having the same capacity.

Accordingly, the RAID controller 180 may recognize the function PF0 of the storage device (SSD) 401 as a first storage device (SSD1), the function PF0 and the function PF1 of the storage device (SSD) 402 as a second storage device (SSD2) and a third storage device (SSD3), respectively, and the function PF0, the function PF1, the function PF2, and the function PF3 of the storage device (SSD) 403 as a fourth storage device (SSD4), a fifth storage device (SSD5), a sixth storage device (SSD6), and a seventh storage device (SSD7), respectively, and may RAID-couple the first to seventh storage devices (SSD1 to SSD7).

In addition, when the first to seventh storage devices (SSD1 to SSD7) are RAID-coupled, the functions SSD1 to SSD7, to each of which the reference capacity is allocated may be maintained until the RAID-coupling is initialized, even when power is not supplied.

Figure 8:
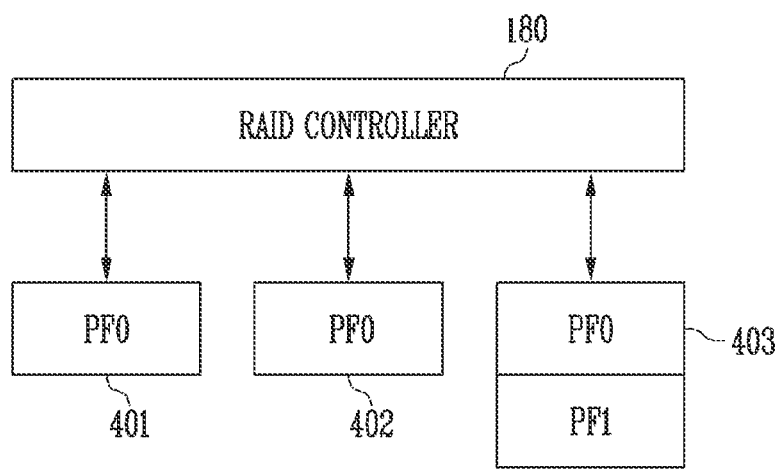
FIG. 8 is a diagram illustrating a method of allocating capacities to respective functions when an SSD that does not support a predetermined protocol is coupled according to an embodiment of the present disclosure.

FIG. 8 is a diagram illustrating a method of allocating capacities to respective functions when the non-supporting storage device is coupled according to an embodiment of the present disclosure.

Referring to FIGS. 5 and 8, FIG. 8 illustrates a method of allocating capacities to respective functions when the host 500 outputs, by a predetermined method as in the embodiment shown in FIG. 5, the function information FNC_INF allocating the determined number of functions to each of the storage devices 401 to 403 but a storage device does not support the predetermined method, that is, a predetermined protocol among the storage devices 401 to 403.

By way of example, in an embodiment shown in FIG. 8, the non-supporting storage device that does not support a predetermined protocol is the storage device (SSD) 402 in the context of the following description.

According to an embodiment, when the storage device (SSD) 402 is the non-supporting storage device that does not support the predetermined protocol, capacities may be allocated to respective functions not based on the greatest common divisor of the capacities of the plurality of storage devices 401, 402, and 403 but based on the capacity of the storage device (SSD) 402.

For example, because the capacity of the storage device (SSD) 402 that does not support the predetermined protocol is 1 TB, the RAID controller 180 may set the reference capacity to 1 TB. Accordingly, because the capacity of the storage device (SSD) 401 is 512 GB, which is less than the reference capacity of 1 TB, the RAID controller 180 may determine one function (PF0) to be allocated to the storage device (SSD) 401. Because the capacity of the storage device (SSD) 402 is the reference capacity, the RAID controller 180 may determine one function (PF0) to be allocated to the storage device (SSD) 401. In addition, the RAID controller 180 may determine two functions (PF0 and PF1) to be allocated to the storage device (SSD) 403.

Accordingly, a single unit of the reference capacity is allocated to one function (PF0) allocated to the storage device (SSD) 401, and the single unit of the reference capacity for the function PF0 may be 512 GB. In addition, a single unit of the reference capacity is allocated to one function (PF0) allocated to the storage device (SSD) 402, and the single unit of the reference capacity for the function PF0 may be 1 TB. A capacity of two units of the reference capacity is allocated to two functions (PF0 and PF1) allocated to the storage device (SSD) 403, and the reference capacity for each of the two functions PF0 and the PF1 may be 1 TB.

As a result, when the storage device (SSD) 402 is the non-supporting storage device that does not support the predetermined protocol, the reference capacity of 1 TB is allocated to each function allocated to each of the plurality of storage devices 401, 402, and 403. Accordingly, the capacity of the function PF0 in the storage device (SSD) 401 may be 512 GB, whereas the capacity of each of the function PF0 and the function PF1 in the storage device (SSD) 402 or the storage device (SSD) 403 may be 1 TB. In addition, the number of functions to be allocated to each of the plurality of storage devices 401, 402, and 403 may be determined according to the reference capacity.

When a capacity is allocated to each function in the plurality of storage devices 401, 402, and 403 in the above-described manner, the plurality of storage devices 401, 402, and 403 having different capacities may be utilized in their entirety even when the storage device (SSD) 402 does not support the predetermined protocol. In other words, the plurality of storage devices 401, 402, and 403 having different capacities may be RAID-coupled without depending on a storage device having the smallest capacity among the plurality of storage devices 401, 402, and 403.

Figure 9:
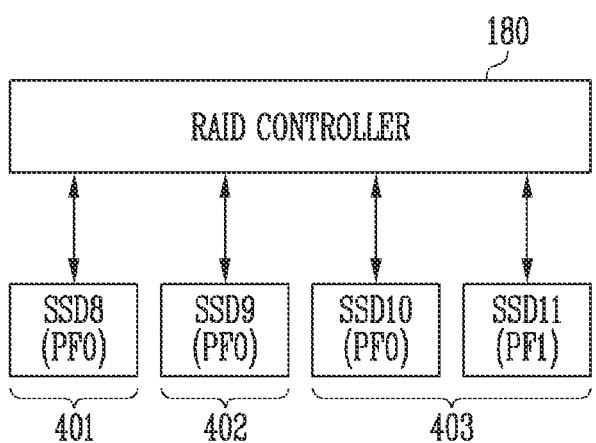
FIG. 9 is a diagram illustrating a RAID operation after allocating capacities to respective functions as shown in FIG. 8 according to an embodiment of the present disclosure.

FIG. 9 is a diagram illustrating a RAID operation after allocating capacities to respective functions as shown in FIG. 8 according to an embodiment of the present disclosure.

Referring to FIGS. 8 and 9, FIG. 9 illustrates a RAID operation after the reference capacity of 1 TB is allocated to each function in the plurality of storage devices 401, 402, and 403 as in the embodiment described with reference to FIG. 8.

According to an embodiment, when the reference capacity is allocated to each function allocated to each of the plurality of storage devices 401, 402, and 403, the RAID controller 180 or the CPU 110 shown in FIG. 1 may recognize each function as one storage device. In other words, the RAID controller 180 or the CPU 110 shown in FIG. 1 may detect and RAID-couple the functions having the same capacity.

Accordingly, the RAID controller 180 may recognize the function PF0 of the storage device (SSD) 401 as an eighth storage device (SSD8), the function PF0 of the storage device (SSD) 402 as a ninth storage device (SSD9), and the function PF0 and the function PF1 of the storage device (SSD) 403 as a tenth storage device (SSD10) and an eleventh storage device (SSD11), respectively, and may RAID-couple the eighth to eleventh storage devices (SSD8 to SSD11).

In addition, when the eighth to eleventh storage devices (SSD8 to SSD11) are RAID-coupled, the functions SSD8 to SSD11, to each of which the reference capacity is allocated may be maintained until the RAID-coupling is initialized, even when power is not supplied.

Figure 10:
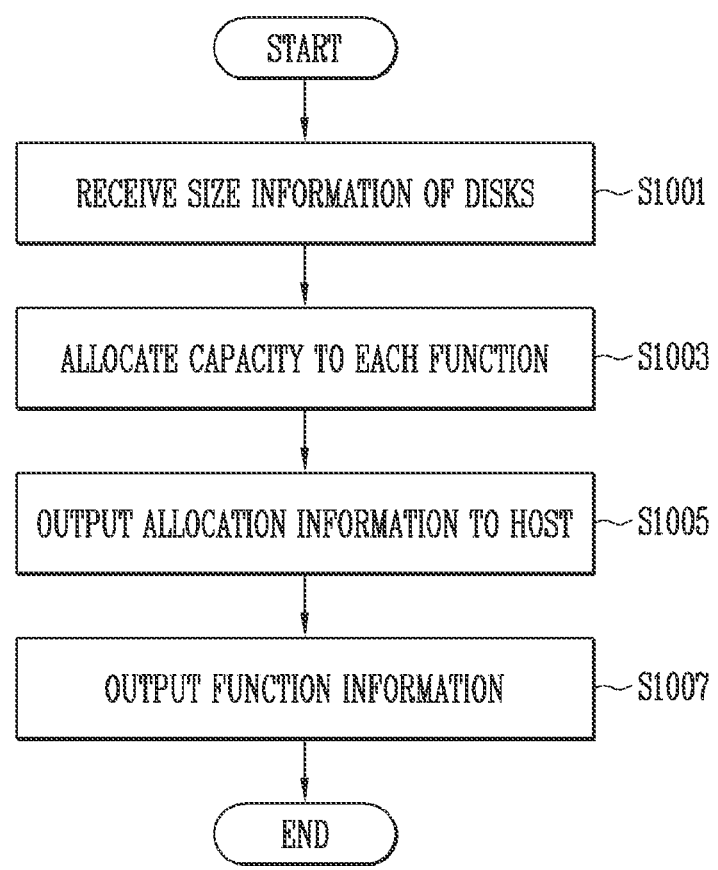
FIG. 10 is a diagram illustrating an operation of a PCIe interface device according to an embodiment of the present disclosure.

FIG. 10 is a diagram illustrating an operation of a PCIe interface device according to an embodiment of the present disclosure.

Referring to FIG. 10, at operation S1001, a PCIe interface device may receive size information from each of a plurality of storage devices respectively coupled to PCIe endpoints or legacy endpoints. Each of the plurality of storage devices may be a solid-state drive (SSD) device or a hard drive (HDD) device. The size information of each of the plurality of storage devices indicates a capacity of each of the plurality of storage devices and the capacities of the plurality of storage devices may be different.

At operation S1003, the PCIe interface device may determine a number of functions to be allocated to each of the plurality of storage devices. More specifically, the PCIe interface device may identify the capacities of the respective storage devices based on the size information, and may then determine the number of functions to be allocated to each of the storage devices based on the greatest common divisor of the capacities of the plurality of storage devices. The capacity corresponding to the greatest common divisor may be a reference capacity. Accordingly, the PCIe interface device may determine the number of functions allocated to each storage device based on a reference capacity per function.

At operation S1005, the PCIe interface device may output allocation information to a host. The allocation information may represent the number of functions to be allocated to each storage device according to the reference capacity.

At operation S1007, the PCIe interface device may transfer function information received from the host to each storage device. Each storage device may divide its capacity into one or more units of the reference capacity according to the number of functions allocated thereto through the function information. Each of the storage devices may allocate the divided units of the reference capacity to the respective functions allocated thereto.

When one or more units of the reference capacity are allocated to each function allocated to the plurality of storage devices, the PCIe interface device may recognize each function as one storage device. In other words, the PCIe interface device may detect and RAID-couple the storage devices having the same capacity.

Figure 11:
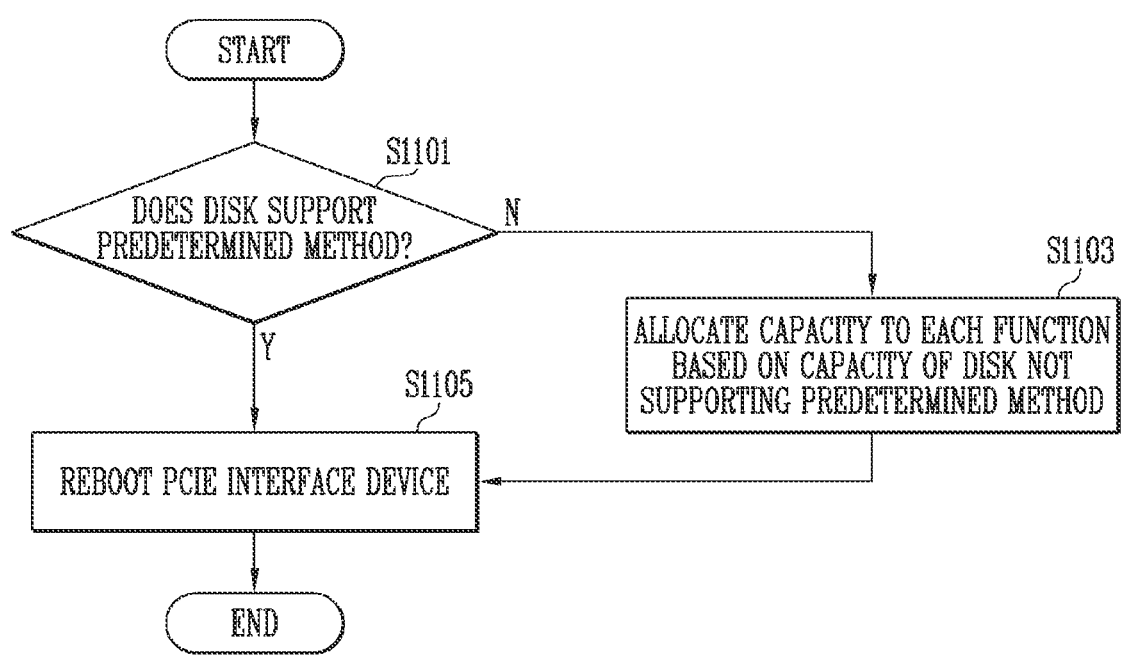
FIG. 11 is a diagram illustrating an operation of a PCIe interface device according to an embodiment of the present disclosure.

FIG. 11 is a diagram illustrating an operation of a PCIe interface device according to an embodiment of the present disclosure.

Referring to FIGS. 10 and 11, FIG. 11 illustrates operations subsequent to operation S1007 shown in FIG. 10 according to an embodiment of the present disclosure.

At operation S1101, the PCIe interface device may determine whether each storage device supports a predetermined method.

According to an embodiment, the host may output function information allocating the number of functions to each of the storage devices through the PCIe interface device by the predetermined method. However, the storage devices may support or might not support the predetermined method, that is, a predetermined protocol. Accordingly, the PCIe interface device may determine whether each storage device supports the predetermined protocol.

When a storage device does not support the predetermined method (a result of operation S1101 is No (N)), the process flow may proceed to operation S1103; when a storage device supports the predetermined method (a result of operation S1101 is Yes (Y)), the process flow may proceed to operation S1105.

At operation S1103, the PCIe interface device may allocate a capacity to each function based on a capacity of the storage device that does not support the predetermined method. In other words, the PCIe interface device may set, as a reference capacity, the capacity of the storage device that does not support the predetermined protocol, but not the greatest common divisor of the capacities of the plurality of storage devices and may allocate the reference capacity to each function based on the capacity of the storage device that does not support the predetermined protocol. When the capacity is allocated to each function based on the capacity of the storage device that does not support the predetermined protocol, the process flow may proceed to operation S1105.

At operation S1105, when the storage device supports the predetermined method or when the capacity is allocated to each function based on the capacity of the storage device that does not support the predetermined method, the PCIe interface device may be rebooted. Thereafter, the functions to each of which the reference capacity is allocated may be maintained until the RAID-coupling is initialized, even when power is not supplied.

In an embodiment, when the storage devices are not solid-state drives (SSDs), operation S1105 may be omitted.

According to embodiments of the present disclosure, a PCIe interface device capable of RAID-coupling SSDs having different capacities and a method of operating the PCIe interface device may be provided.

While various embodiments have been described above, it will be understood by those skilled in the art that the embodiments described are examples only. Accordingly, the Peripheral Component Interconnect Express (PCIe) interface device and the operating method thereof described herein should not be limited based on the described embodiments. It will be apparent to those skilled in the art in light of the present disclosure that various changes and modifications may be made without departing from the spirit and scope of the disclosure as defined in the following claims. Furthermore, the embodiments may be combined to form additional embodiments.

2. Storing Data According to a RAID Method without a RAID Controller

Figure 12:
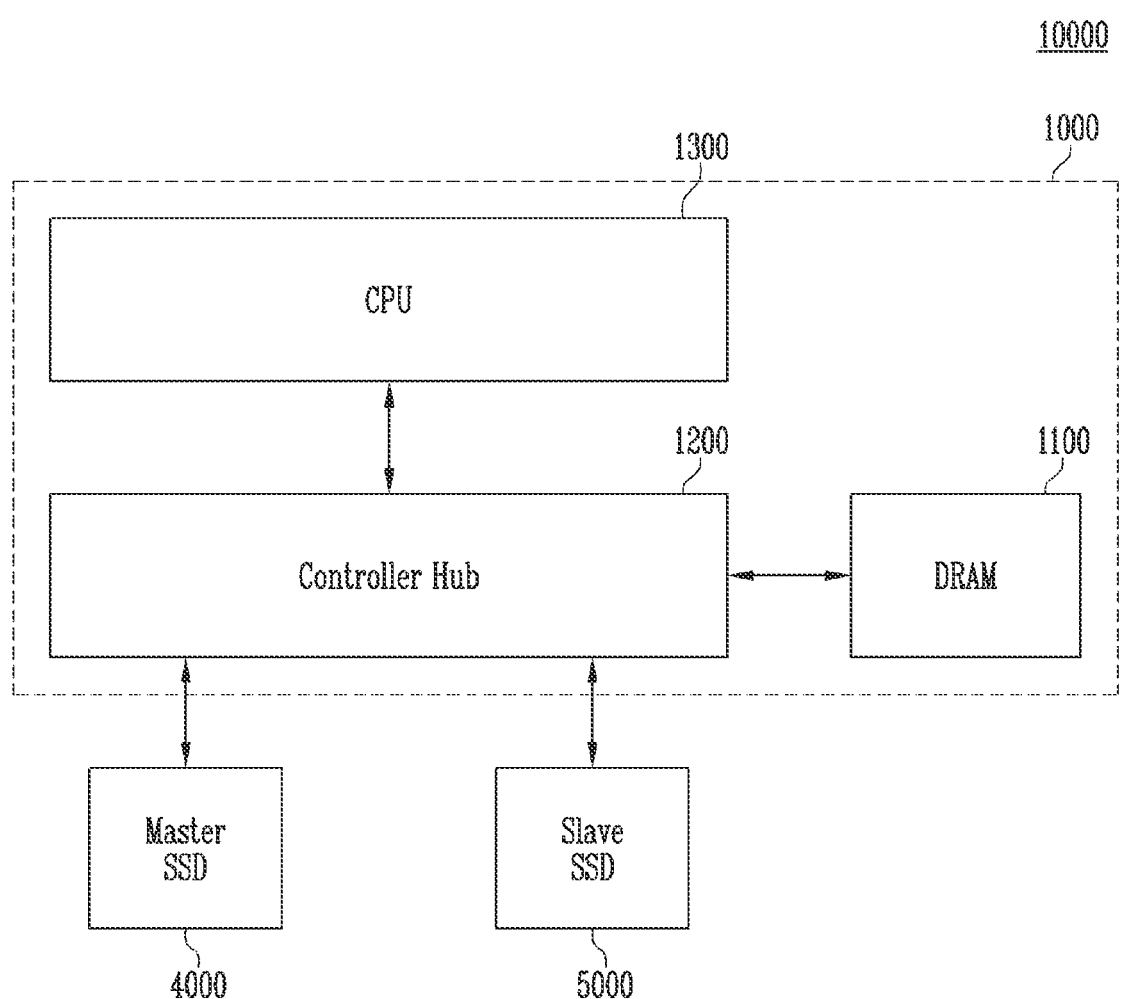
FIG. 12 is a diagram illustrating a computing system according to an embodiment of the present disclosure.

FIG. 12 is a diagram illustrating a computing system 10000 according to an embodiment of the present disclosure.

Referring to FIG. 12, the computing system 10000 may include a host device 1000, a master solid state drive (SSD) 4000, and a slave SSD 5000. For example, the computing system 10000 may be a cellular phone, a smartphone, an MP3 player, a laptop computer, a desktop computer, a display device, a tablet PC, or the like.

The host device 1000 may include Dynamic Random Access Memory (DRAM) 1100, a controller hub 1200, and a central processing unit (CPU) 1300.

The DRAM 1100 may store data, commands, or program codes used for performing operations of the host device 1000. According to an embodiment, the DRAM 1100 may store program codes used for running one or more operating systems (OSs) and virtual machines (VMs), and program codes used for running a virtualization intermediary (VI) for managing VMs.

The controller hub 1200 may be a root hub, a root complex, or a root controller in Peripheral Component Interconnect Express (PCIe) interconnect architecture. For example, the controller hub 1200 may include a chipset, a memory controller hub (MCH), a northbridge, an interconnect controller hub (ICH), a southbridge, and a root controller/hub. In addition, the controller hub 1200 may couple the DRAM 1100 and the CPU 1300 to an input/output (I/O) hierarchy. The controller hub 1200 may support Peer-to-Peer (P2P) routing. The controller hub 1200 may include at least one host bridge and at least one root port. The controller hub 1200 may support one or more PCIe ports.

The CPU 1300 may generally control the computing system 10000. More specifically, the CPU 1300 may include circuits, interfaces, or program codes used for controlling data processing and operations of components of the computing system 10000.

The computing system 10000 may include the master SSD 4000 and the slave SSD 5000. The master SSD 4000 and the slave SSD 5000 may store data. More specifically, the master SSD 4000 and the slave SSD 5000 may store data received from the host device 1000 in response to a command processing request from the CPU 1300. According to an embodiment of the present disclosure, when the master SSD 4000 receives the command processing request from the CPU 1300, the master SSD 4000 may transfer a command corresponding to the slave SSD 5000 to the slave SSD 5000 through the controller hub 1200. More specifically, the master SSD 4000 may store data according to a Redundant Array of Independent Disks (RAID) level determined by the host device 1000 or the CPU 1300. The master SSD 4000 may transfer the command corresponding to the slave SSD 5000 to the slave SSD 5000 such that the slave SSD 5000 stores the data according to the determined RAID level. The master SSD 4000 may use P2P routing supported by the controller hub 1200. Further, the master SSD 4000 may serve as a RAID controller. Conventionally, a separate RAID controller is required to store or read data by a method corresponding to a RAID. However, according to an embodiment of the present disclosure, an SSD may perform a function of a RAID controller by using P2P routing without a separate RAID controller or hardware device.

In addition, according to an embodiment of the present disclosure, the master SSD 4000 may serve as the raid controller 1800, described in FIG. 1 and FIGS. 4 to 11. According to the embodiment of the present disclosure, the master SSD 4000 may perform RAID-coupling the master SSD 4000 and the slave SSD 5000 having different capacities by allocating capacities to respective functions of the master and slave SSDs 4000 and 5000 based on the greatest common divisor of the capacities of the master and slave SSDs 4000 and 5000. The function may refer to a physical function (PF) between the physical function (PF) and a virtual function (VF).

The master SSD 4000 and the slave SSD 5000 may perform an internal operation corresponding to the command processing request. The internal operation may be a read operation for reading data stored in the master SSD 4000 or the slave SSD 5000, or a write operation for storing data in the master SSD 4000 or the slave SSD 5000. For example, the master SSD 4000 or the slave SSD 5000 may store data or read stored data by a method corresponding to a RAID level 0.

In the embodiments according to the present disclosure, the SSDs are described by different names, that is, the master SSD 4000 and the slave SSD 5000, for functional classification. However, when a computing system including SSDs is implemented, the same type of SSDs may be used. Alternatively, the master SSD 4000 and the slave SSD 5000 may be formed to have physically the same circuit. In addition, roles of the SSDs as the master SSD 4000 and the slave SSD 5000 may be determined by the host device 1000 or the CPU 1300. More specifically, the host device 1000 or the CPU 1300 may set one of a plurality of SSDs coupled to the host device 1000 to be a master SSD 4000 and the remaining SSDs except for the master SSD 4000 to be slave SSDs 5000. The host device 1000 or the CPU 1300 may determine the master SSD 4000 and the slave SSD 5000 according to a command input by a user using software or an application. In addition, a storage method according to a RAID level formed by the master SSD 4000 and the slave SSD 5000 may also be determined by the host device 1000 or the CPU 1300 in the same way.

Alternatively, roles of the SSDs as the master SSD 4000 or the slave SSD 5000 may be determined by the host device 1000 or the CPU 1300, and may be arbitrarily determined. More specifically, the host device 1000 or the CPU 1300 may identify a plurality of SSDs coupled to the controller hub 1200, and the host device 1000 or the CPU 1300 may set an SSD coupled to a specific port of the controller hub 1200 among the plurality of SSDs to perform a role as the master SSD 4000. The specific port may refer to a port corresponding to an SSD coupled first to the controller hub 1200 or the host device 1000 among the plurality of SSDs. Alternatively, the specific port may be a port corresponding to the smallest bus number among bus numbers. The above-described method amounts to an embodiment in which the master SSD 4000 and the slave SSD 5000 are set. However, the master SSD 4000 and the slave SSD 5000 may be set by various methods other than the above-described method.

FIG. 12 illustrates the embodiment having a structure in which solid state drives (SSDs), for example, the master SSD 4000 and the slave SSD 5000, are coupled to the host device 1000. However, an embodiment of the present disclosure is not limited thereto, and the master SSD 4000 and the slave SSD 5000 may be replaced by a storage device other than the SSD. For example, the master SSD 4000 and the slave SSD 5000 may be embodied as one of various types of storage devices such as a multimedia card in the form of a multimedia card (MMC), (e.g., an eMMC, an RS-MMC, or a micro-MMC), a secure digital card in the form of an SD (e.g., a mini-SD or a micro-SD), a Universal Serial Bus (USB) storage device, a Universal Flash Storage (UFS) device, a Personal Computer Memory Card International Association (PCMCIA) card type storage device, a Peripheral Component Interconnect (PCI) card type storage device, a PCI Express (PCIe) card type storage device, a Compact Flash (CF) card, a smart media card, and/or a memory stick.

Figure 13:
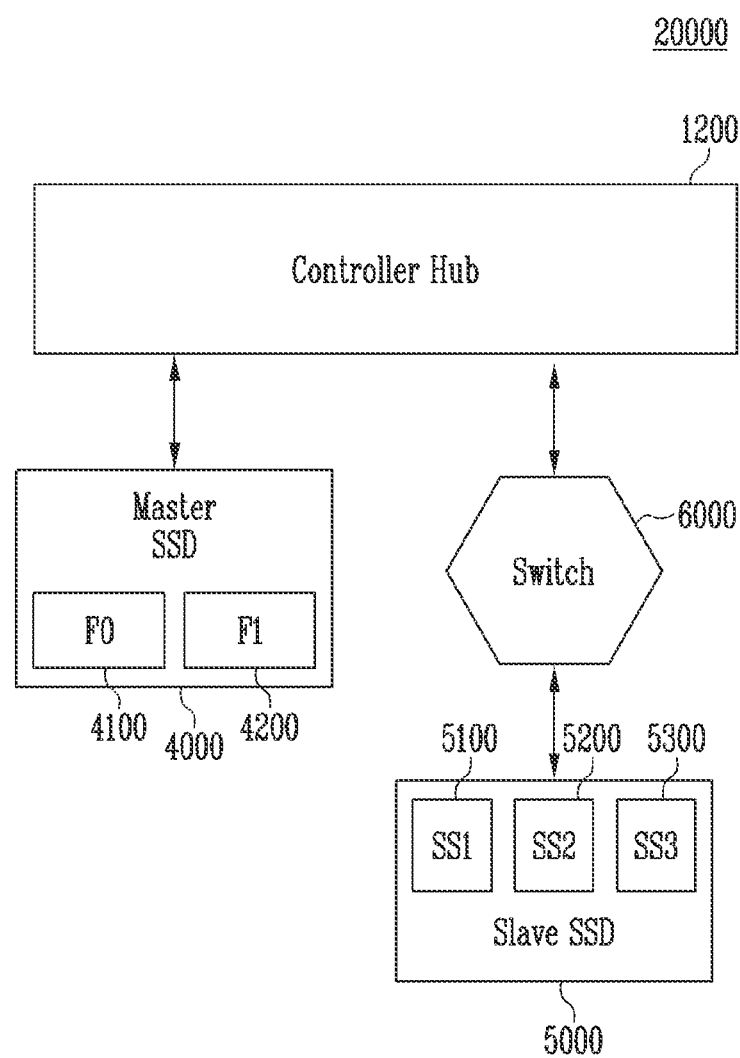
FIG. 13 is a diagram illustrating a storage system according to an embodiment of the present disclosure.

FIG. 13 is a diagram illustrating a storage system 20000 according to an embodiment of the present disclosure.

Referring to FIG. 13, the storage system 20000 may include the controller hub 1200, the master SSD 4000, and a slave SSD 5000. Because the controller hub 1200 and the master SSD 4000 are described above in detail, an additional detailed description will be omitted for the sake of brevity.

The master SSD 4000 may include functions. More specifically, the master SSD 4000 may include a function 0 4100 and a function 1 4200. The function may be a unit of an individual operation for providing physical resources included in a storage device. In FIG. 13, by way of example, two functions included in the master SSD 4000 are illustrated. However, depending on embodiments, the number of functions included in the master SSD 4000 is not limited to two, and the slave SSD 5000 may also include a plurality of functions.

The slave SSD 5000 may include a plurality of SSDs. More specifically, the slave SSD 5000 may include a first slave SSD 5100, a second slave SSD 5200, and a third slave SSD 5300. Because each of the first to third slave SSDs 5100 to 5300 is described in detail with reference to FIG. 12, an additional detailed description will be omitted for the sake of brevity. The first slave SSD 5100, the second slave SSD 5200, and the third slave SSD 5300 together may be treated as a single storage array according to the RAID scheme to be described below. According to an embodiment of the present disclosure, the first slave SSD 5100, the second slave SSD 5200, and the third slave SSD 5300 may perform an internal operation according to commands distributed from the master SSD 4000. The internal operation may be a read operation for reading data stored in the slave SSD 5000, or a write operation for storing data in the slave SSD 5000. In FIG. 13, by way of example, three SSDs included in the slave SSD 5000 are illustrated. However, the number of SSDs included in the slave SSD 5000 is not limited thereto.

A switch 6000 may route a packet or a message upstream or downstream. More specifically, the switch 6000 may route the packet or the message upward from the slave SSD 5000 towards the controller hub 1200. Alternatively, the switch 6000 may route the packet or the message downward from the controller hub 1200 towards the slave SSD 5000.

According to an embodiment, the switch 6000 may be referred to as a logic assembly of a plurality of virtual PCI-to-PCI bridge devices. Examples of devices that may be coupled to the switch 6000 include an arbitrary internal or external device, or a component coupled to electronic systems such as an I/O device, a network interface controller (NIC), an add-in card, an audio processor, a network processor, a hard drive, a storage device, CD/DVD ROM, a monitor, a printer, a mouse, a keyboard, a router, a mobile storage device, a FireWire device, a Universal Serial Bus (USB) device, a scanner, and another input/output device. Although not illustrated in detail, the device may include a PCIe-to-PCI/PCIX bridge supporting a legacy version or another version of a PCI device.

Figure 14:
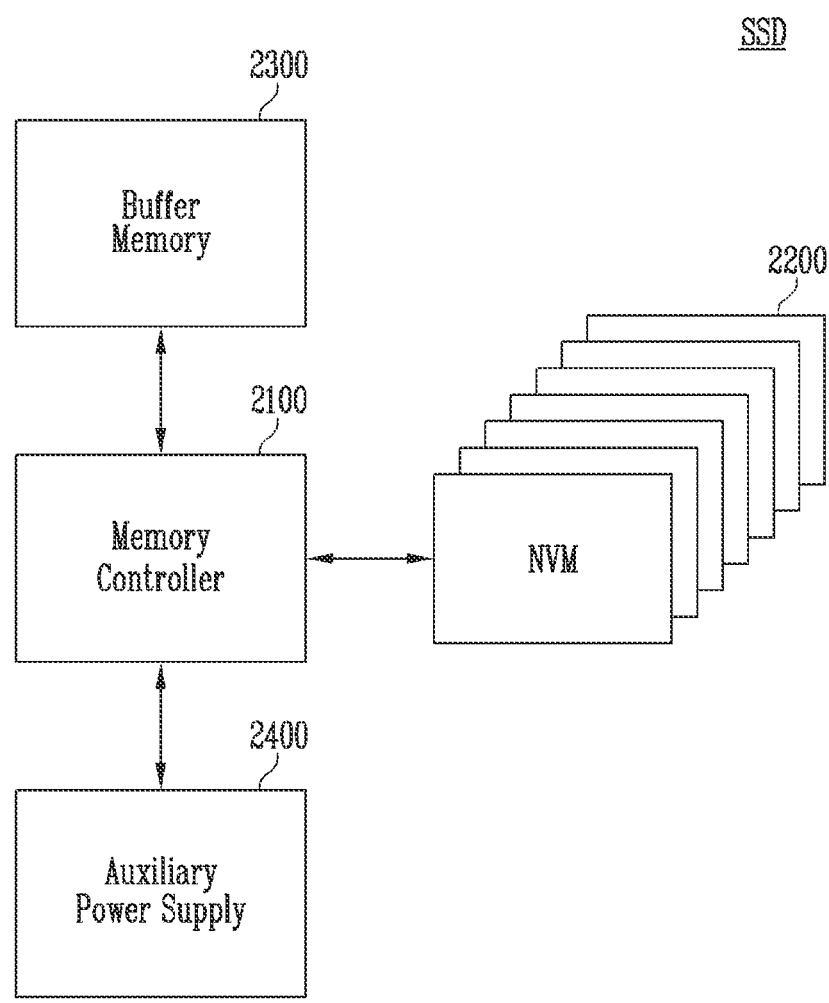
FIG. 14 is a diagram illustrating a solid state drive (SSD) according to an embodiment of the present disclosure.

FIG. 14 is a diagram illustrating a solid state drive (SSD) according to an embodiment of the present disclosure.

Referring to FIG. 14, the SSD may include a memory controller 2100, a plurality of flash memory 2200, buffer memory 2300, and an auxiliary power supply 2400.

According to an embodiment, the memory controller 2100 may control the plurality of flash memory 2200 in response to signals received from the host device 1000. For example, the signals may be signals based on interfaces of the host device 1000 and the SSD. More specifically, the signals may be signals defined according to a Peripheral Component Interconnect (PCI) or PCI Express (PCIe) or defined by at least one of interfaces such as a Universal Serial Bus (USB), a multimedia card (MMC), an embedded MMC (eMMC), Advanced Technology Attachment (ATA), Serial-ATA, Parallel-ATA, a Small Computer System Interface (SCSI), an Enhanced Small Disk Interface (ESDI), Integrated Drive Electronics (IDE), FireWire, Universal Flash Storage (UFS), Wi-Fi, Bluetooth, and nonvolatile memory express (NVMe).

The buffer memory 2300 may operate as an internal memory of the SSD. For example, the buffer memory 2300 may temporarily store data received from the host device 1000 or data received from the plurality of flash memory 2200, or may temporarily store metadata (e.g., mapping tables) of the plurality of flash memory 2200. The buffer memory 2300 may include volatile memory such as Dynamic Random Access Memory (DRAM), Synchronous DRAM (SDRAM), Double Data Rate SDRAM (DDR SDRAM), Low Power DDR SDRAM (LPDDR SDRAM), and Graphic RAM (GRAM) or nonvolatile memory such as Ferroelectric RAM (FRAM), Resistive RAM (ReRAM), Spin-Transfer Torque Magnetic RAM (STT-MRAM), and Phase-change RAM (PRAM).

The auxiliary power supply 2400 may be charged with power supplied from the host device 1000. The auxiliary power supply 2400 may supply power to the SSD when power is not smoothly supplied from the host device 1000. For example, the auxiliary power supply 2400 may be disposed within or external to the SSD. For example, the auxiliary power supply 2400 may be disposed on a main board and may supply auxiliary power to the SSD.

Figure 15:
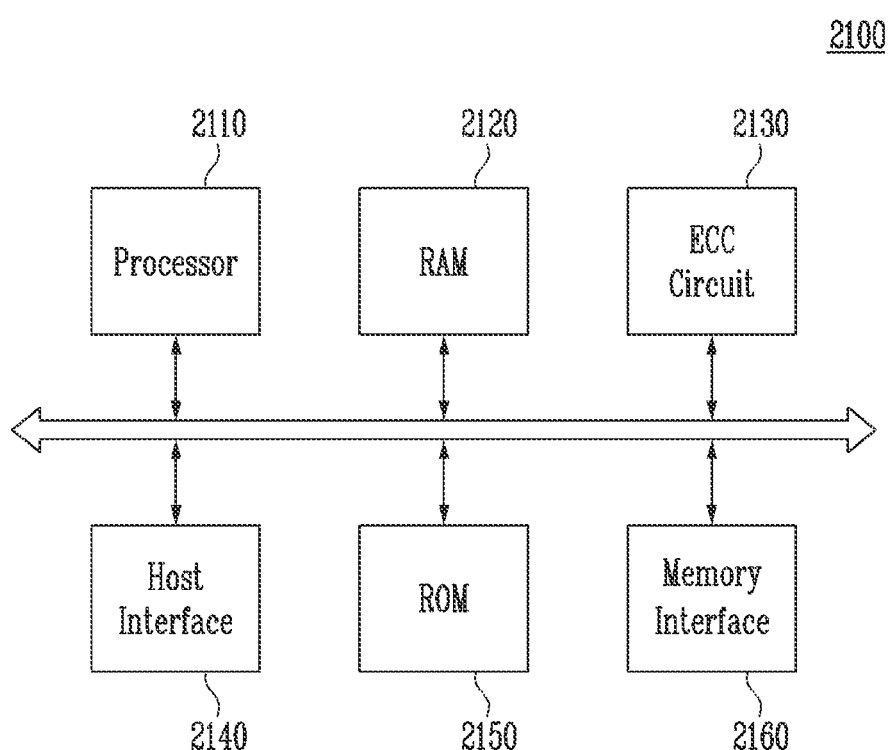
FIG. 15 is a diagram illustrating a memory controller according to an embodiment of the present disclosure.

FIG. 15 is a diagram illustrating the memory controller 2100 according to an embodiment of the present disclosure.

Referring to FIG. 15, the memory controller 2100 may include a processor 2110, RAM 2120, an error correction code (ECC) circuit 2130, a host interface 2140, ROM 2150, and a memory interface 2160. The memory controller 2100 illustrated in FIG. 15 is an embodiment of the memory controller 2100 shown in FIG. 14.

The processor 2110 may communicate with the host device 1000 or the CPU 1300 using the host interface 2140 and perform a logical operation to control an operation of the memory controller 2100. For example, the processor 2110 may load a program command, a data file, or a data structure, perform various operations, or generate a command and an address based on a request received from the host device 1000 or the CPU 1300. For example, the processor 2110 may generate various commands used for performing a program operation, a read operation, an erase operation, a suspend operation, and a parameter setting operation.

The processor 2110 may perform a function of a flash translation layer (FTL). The processor 2110 may translate a logical block address (LBA), provided by the host device 1000 or the CPU 1300, into a physical block address (PBA)

through the FTL. The FTL may receive the LBA and translate the LBA into the PBA by using a mapping table. There are various address mapping methods for the FTL depending on a mapping unit. Typical address mapping methods include a page mapping method, a block mapping method, and a hybrid mapping method.

The processor 2110 may generate a command without a request from the host device 1000. For example, the processor 2110 may generate a command for background operations such as operations for wear leveling of a memory device and operations for garbage collection of the memory device.

The RAM 2120 may serve as buffer memory, operational memory, or cache memory of the processor 2110. The RAM 2120 may store codes and commands executed by the processor 2110. The RAM 2120 may store data processed by the processor 2110. When the RAM 2120 is implemented, the RAM 2120 may include Static RAM (SRAM) or Dynamic RAM (DRAM).

The ECC circuit 2130 may detect and correct an error during a program operation or a read operation. More specifically, the ECC circuit 2130 may perform an error correction operation according to an error correction code (ECC). The ECC circuit 2130 may perform ECC encoding based on data to be written to the memory device. The ECC-encoded data may be transferred to the memory device through the memory interface 2160. In addition, the ECC circuit 2130 may perform ECC decoding on data received from the memory device through the memory interface 2160.

The host interface 2140 may include a protocol for exchanging data between the host device 1000 and the memory controller 2100. More specifically, the host interface 2140 may be configured to communicate with the host device 1000 using a Peripheral Component Interconnect (PCI) protocol or a PCI Express (PCIe) protocol. In addition, the host interface 2140 may communicate with the host device 1000 through one or more various interface protocols such as a Universal Serial Bus (USB) protocol, a multimedia card (MMC) protocol, an Advanced Technology Attachment (ATA) protocol, a Serial-ATA protocol, a Parallel-ATA protocol, a Small Computer System Interface (SCSI) protocol, an Enhanced Small Disk Interface (ESDI) protocol, an Integrated Drive Electronics (IDE) protocol, and a private protocol.

The ROM 2150 may serve as a storage unit storing various types of information used for operations of the memory controller 2100. More specifically, the ROM 2150 may include a map table and the map table may store physical-to-logical address information and logical-to-physical address information. The ROM 2150 may be controlled by the processor 2110.

The memory interface 2160 may communicate with the memory device using a communication protocol according to control of the processor 2110. More specifically, the memory interface 2160 may communicate commands, addresses, and data with the memory device through channels. For example, the memory interface 2160 may include a NAND interface.

Figure 16:
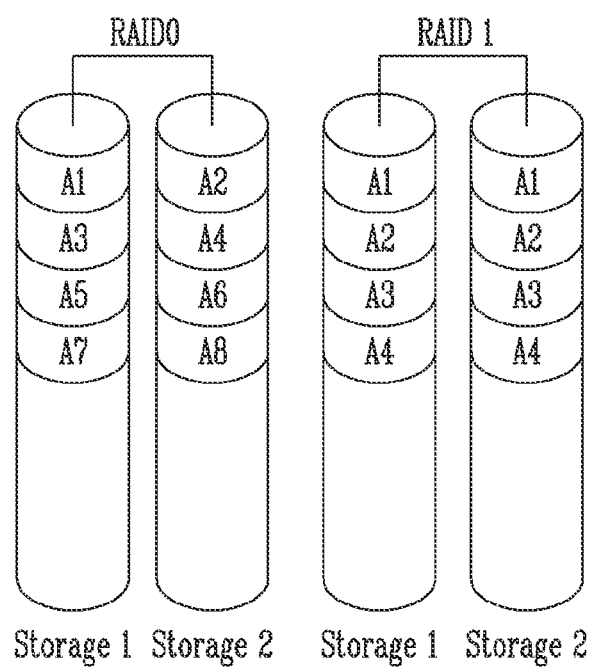
FIG. 16 is a diagram illustrating a RAID level 0 and a RAID level 1 according to an embodiment of the present disclosure.

FIG. 16 is a diagram illustrating a RAID level 0 and a RAID level 1 according to an embodiment of the present disclosure.

Referring to FIG. 16, storage methods according to the RAID level 0 and the RAID level 1 are illustrated. The RAID may be a methodology or scheme of distributing and storing data across a plurality of storage devices. According to the RAID scheme, the plurality of storage devices are regarded as a single storage array. The RAID scheme has several levels including RAID levels 0 to 6 and more, according to a structure of the storage devices as the single storage array.

According to the RAID level 0, data may be stored by striping the data in a plurality of storage devices. The term "striping" may refer to an operation of distributing the data across the plurality of storage devices. According to the RAID level 0, at least two storage devices may be used. For example, according to the RAID level 0, a first storage device and a second storage device may be used. For example, according to the RAID level 0, data A may be striped across the first storage device and the second storage device such that a first block A1, a third block A3, a fifth block A5, and a seventh block A7 are stored in the first storage device and a second block A2, a fourth block A4, a sixth block A6, and an eighth block A8 are stored in the second storage device.

According to the RAID level 0, plural pieces (e.g., the first to eighth block A1 to A8) of data (e.g., the data A) are distributed and stored in the plurality of storage devices, and therefore a storage speed may be high and capacities of the plurality of storage devices may be utilized as much as possible. On the other hand, according to the RAID level 0, when an error occurs in one data piece (e.g., the first block A1) stored in a single storage device among the plural storage devices, entire data (e.g., the data A) striped into the plurality of storage devices might not be reliable. Accordingly, stability of stored data might not be ensured.

According to the RAID level 1, data may be stored by mirroring the data in a plurality of storage devices. The term "mirroring" may refer to an operation of copying the identical data onto the plurality of storage devices. According to the RAID level 1, at least two storage devices may be used. For example, in the storage method corresponding to the RAID level 1, a first storage device and a second storage device may be used. For example, according to the RAID level 1, data A may be mirrored on the first storage device and the second storage device such that a first block A1, a second block A2, a third block A3, and a fourth block A4 are stored in the first storage device and the identical set of data pieces, that is, the first block A1, the second block A2, the third block A3, and the fourth block A4 are stored in the second storage device.

According to the RAID level 1, the identical data is mirrored on the plurality of storage devices. Accordingly, when an error occurs in some data pieces (e.g., the first to fourth blocks A1 to A4) stored in some (e.g., the first storage device) of the plurality of storage devices and even when only one storage device (e.g., the second storage device) in which an error does not occur exists among the plurality of storage devices, data (e.g., the data A) may be recovered. On the other hand, according to the RAID level 1, because data is copied and then stored, performance and capacities according to the RAID level 1 may be lower than other RAID levels.

Figure 17:
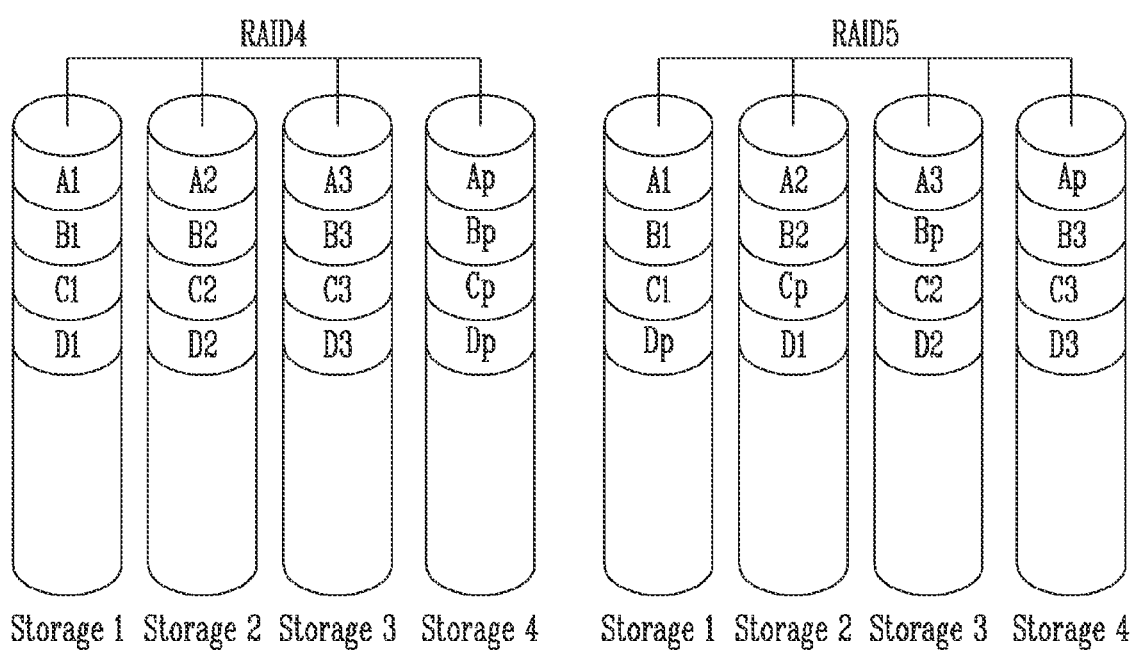
FIG. 17 is a diagram illustrating a RAID level 4 and a RAID level 5 according to an embodiment of the present disclosure.

FIG. 17 is a diagram illustrating the RAID level 4 and the RAID level 5 according to an embodiment of the present disclosure.

Referring to FIG. 17, storage schemes according to the RAID level 4 and the RAID level 5 are illustrated.

According to the RAID level 4, data may be stored by striping the data in a plurality of storage devices and storing a parity for error correction in a single storage device. According to the RAID level 4, at least three storage devices may be used. For example, according to the RAID level 4, a first storage device, a second storage device, a third storage device, and a fourth storage device may be used. The parity may refer to a data piece used to detect and correct an error of the data through an exclusive OR (EOR) operation or the like. For example, according to the RAID level 4, when data A, data B, data C, and data D is to be stored, each of the data A, the data B, the data C, and the data D is striped across the first, second, and third storage devices. For example, plural pieces (e.g., the first to third block A1 to A3) of the data A are distributed and stored in the first to third storage devices. In addition, according to the RAID level 4, a parity (e.g., a parity Ap) of each data (e.g., the data A) stored in the first, second, and third storage devices may be stored in the fourth storage device. That is, according to the RAID level 4, data is split and stored across (n−1) storage devices and one storage device may be used as a parity dedicated storage device. For example, when the data A is stored according to the RAID level 4, a first block A1 of the data A may be stored in the first storage device, a second block A2 of the data A in the second storage device, a third block A3 of the data A in the third storage device, and a parity Ap of the data A in the fourth storage device. According to the RAID level 4, even when an error occurs in one data piece (e.g., the first block A1) stored in a single storage device among the plural storage devices, the whole data (e.g., the data A) may be recovered because of the parity (e.g., the parity Ap) stored in the parity dedicated storage device. However, when errors occur in two or more data pieces (e.g., the first to third block A1 to A3) stored in the storage devices, the whole data (e.g., the data A) might not be recovered from the errors and load may be applied to the storage device storing the parity. In addition, because a parity calculation is required to store the parity, data storage performance may deteriorate.

According to the RAID level 5, data may be stored by striping the data in a plurality of storage devices and storing a parity for error correction in a single storage device. According to the RAID level 5, at least three storage devices may be used. For example, according to the RAID level 5, a first storage device, a second storage device, a third storage device, and a fourth storage device may be used. For example, according to the RAID level 5, when data A, data B, data C, and data D is to be stored, each of the data A, the data B, the data C, and the data D is striped across three of the first to fourth storage devices. For example, plural pieces (e.g., the first to third block A1 to A3) of the data A are distributed and stored in the first to third storage devices. In addition, according to the RAID level 5, a parity (e.g., a parity Ap) of each data (e.g., the data A) stored in the three storage devices may be stored in a remaining one storage device other than the three storage devices among the first, second, third, and fourth storage devices.

The RAID level 5 is the same as the RAID level 4 in that each data is split and stored across (n−1) storage devices and a parity for the data is stored in one storage device. However, the RAID level 5 is different from the RAID level 4 in that, according to the RAID level 5, parities are not stored in a single dedicated storage device but distributed and stored in the plurality of storage devices. For example, when the data A to D are to be stored according to the RAID level 5, a parity Ap of the data A may be stored in the fourth storage device, a parity Bp of the data B in the third storage device, a parity Cp of the data C in the second storage device, and a parity Dp of the data D in the first storage device. According to the RAID level 5, the parities are distributed and stored in the plurality of storage devices, and therefore load, which occurs when a parity is calculated and stored, may be mitigated. In addition, according to the RAID level 5, even when an error occurs in one data piece (e.g., the first block A1) stored in a single storage device among the plural storage devices, the whole data (e.g., the data A) may be recovered because of the parity (e.g., the parity Ap) stored in the storage device. However, when errors occur in two or more data pieces (e.g., the first to third block A1 to A3) stored in the storage devices, the whole data (e.g., the data A) might not be recovered and load may be applied to the storage devices storing the parities. In addition, because a parity calculation is required to store the parity, data storage performance may deteriorate.

Although not illustrated in FIG. 17, the RAID level 6 may reinforce the parity scheme on the RAID level 5 to ensure stability. According to the RAID level 6, data may be split and stored across (n−2) storage devices and parities for the data may be stored in two storage devices. The RAID level 6 may require at least four storage devices. In addition, according to the RAID level 6, even when errors occur in two data pieces stored in two storage devices, the whole data may be recovered by the parities stored in the two storage devices.

Figure 18:
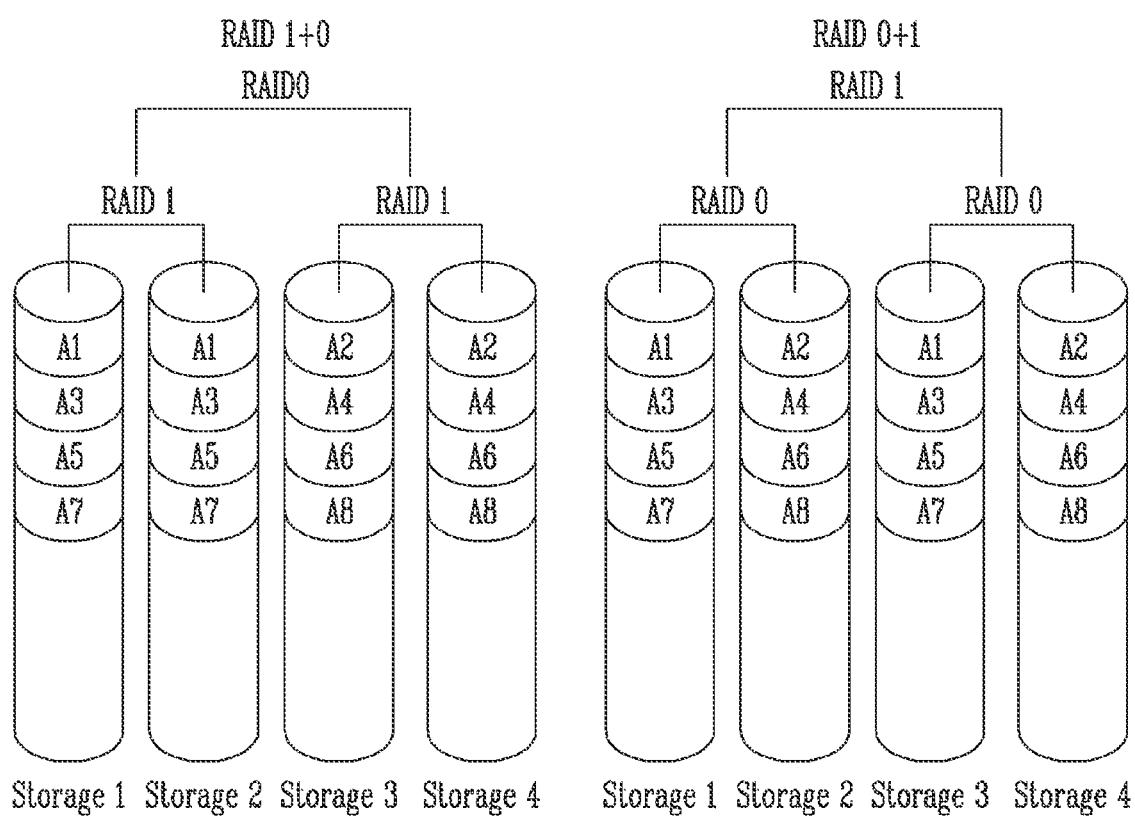
FIG. 18 is a diagram illustrating nested RAID levels according to an embodiment of the present disclosure.

FIG. 18 is a diagram illustrating nested RAID levels according to an embodiment of the present disclosure.

Referring to FIG. 18, a RAID level 1+0 and a RAID level 0+1 using a combination of the RAID level 0 and the RAID level 1 are illustrated. The RAID level 1+0 and the RAID level 0+1 may be based on the RAID level 0 and the RAID level 1.

The RAID level 1+0 may require at least four storage devices, for example, a first storage device, a second storage device, a third storage device, and a fourth storage device. According to the RAID level 1+0, the first storage device and the second storage device may mirror and store the same data. The third storage device and the fourth storage device may mirror and store the same data. According to the RAID level 1+0, storage device groups of storage devices that are grouped by the RAID level 1 may be grouped by the RAID level 0. For example, according to the RAID level 1+0, a group of the first storage device and the second storage device may be striped with a group of the third storage device and the fourth storage device.

The RAID level 0+1 may require at least four storage devices, for example, a first storage device, a second storage device, a third storage device, and a fourth storage device. According to the RAID level 0+1, data may be striped and stored across the first storage device and the second storage device. In addition, the data stored across the first and second storage devices may be mirrored on and stored in the third storage device and the fourth storage device. According to the RAID level 0+1, groups of storage devices that are grouped by the RAID level 0 may be grouped by the RAID level 1. For example, according to the RAID level 0+1, a group of the first storage device and the second storage device may mirror data into a group of the third storage device and the fourth storage device.

Figure 19:
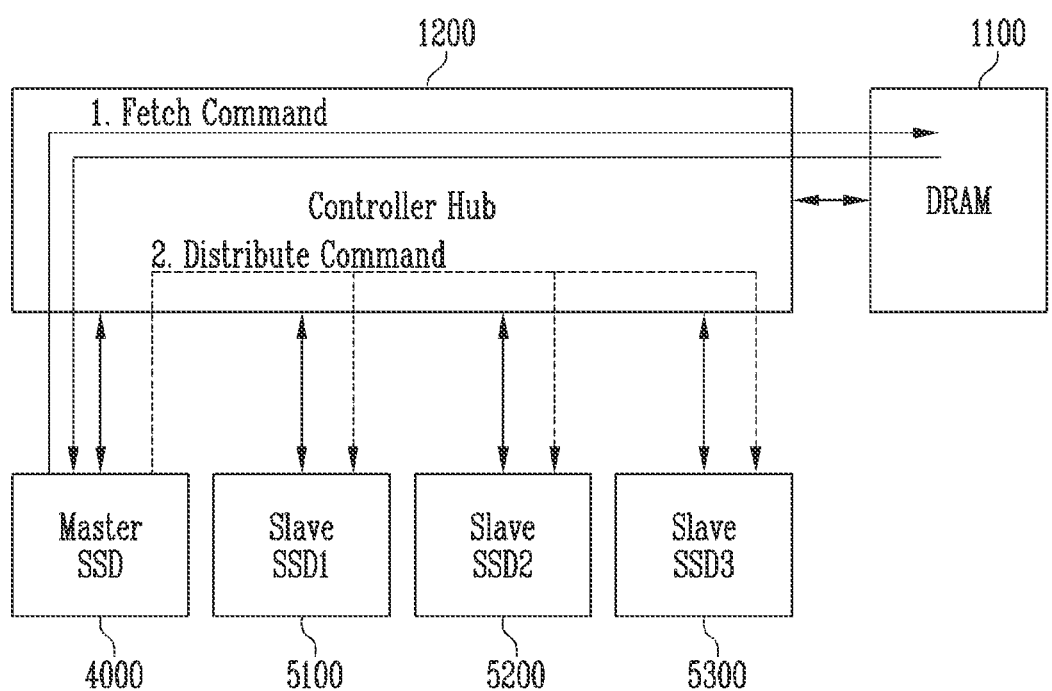
FIG. 19 is a diagram illustrating a method of operating a storage system according to an embodiment of the present disclosure.
Figure 20:
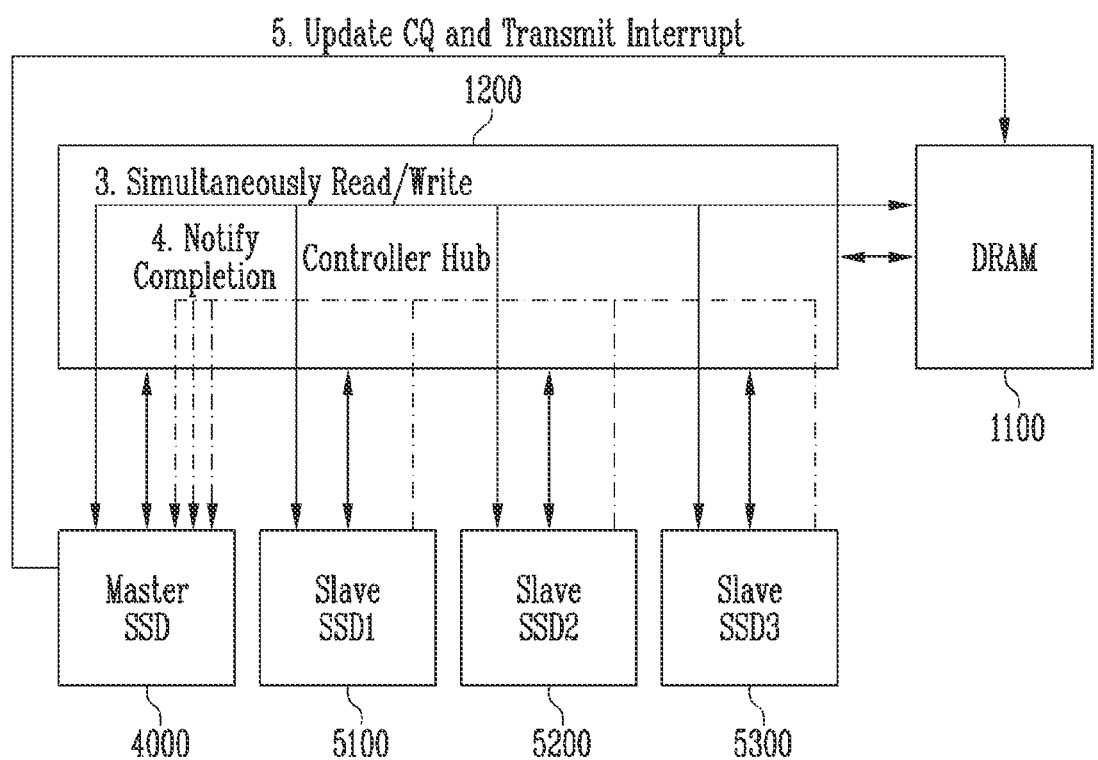
FIG. 20 is a diagram illustrating a method of operating a storage system according to an embodiment of the present disclosure.

FIGS. 19 and 20 are diagrams illustrating a method of operating a storage system 20000 according to an embodiment of the present disclosure. In FIGS. 19 and 20, by way of example, a RAID level is the RAID level 0 that is described above with reference to FIG. 16 in the context of the following description of the method of operating the storage device.

Referring to FIG. 19, the DRAM 1100 and the storage system 20000 are illustrated. The storage system 20000 may include the controller hub 1200, the master SSD 4000, the first slave SSD 5100, the second slave SSD 5200, and the third slave SSD 5300.

The master SSD 4000 may receive a command processing request from the host device 1000. The command processing request may include a write request or a read request.

In a write operation, the host device 1000 may transfer the command processing request only to the master SSD 4000. More specifically, the CPU 1300 of the host device 1000 may store data and commands in the DRAM 1100, and the master SSD 4000 may fetch the commands from the DRAM 1100. The master SSD 4000 may distribute the commands to respective slave SSDs based on a determined RAID level. More specifically, the master SSD 4000 may transfer the commands respectively corresponding to the first slave SSD 5100, the second slave SSD 5200, and the third slave SSD 5300 to the first slave SSD 5100, the second slave SSD 5200, and the third slave SSD 5300 in a one-to-one manner. In addition, each of the master SSD 4000, the first slave SSD 5100, the second slave SSD 5200, and the third slave SSD 5300 may perform a write operation corresponding to the command processing request. More specifically, each of the master SSD 4000, the first slave SSD 5100, the second slave SSD 5200, and the third slave SSD 5300 may receive pieces of data respectively corresponding to the master SSD 4000, the first slave SSD 5100, the second slave SSD 5200, and the third slave SSD 5300 from the DRAM 1100 based on the commands. Each of the master SSD 4000, the first slave SSD 5100, the second slave SSD 5200, and the third slave SSD 5300 may receive data used for performing the write operation. For example, the master SSD 4000, the first slave SSD 5100, the second slave SSD 5200, and the third slave SSD 5300 may store pieces of data respectively corresponding to the master SSD 4000, the first slave SSD 5100, the second slave SSD 5200, and the third slave SSD 5300 among pieces of data striped according to the RAID level 0. In addition, the first slave SSD 5100, the second slave SSD 5200, and the third slave SSD 5300 may notify completion of operations corresponding to the received commands to the master SSD 4000. When operations of the master SSD 4000, the first slave SSD 5100, the second slave SSD 5200, and the third slave SSD 5300 are completed, the master SSD 4000 may notify completion of the operations to the host device 1000. More specifically, the master SSD 4000 may transmit a complete queue (CQ) to the host device 1000.

In a read operation, the host device 1000 may transfer the command processing request only to the master SSD 4000. More specifically, the CPU 1300 of the host device 1000 may store commands in the DRAM 1100, and the master SSD 4000 may fetch the commands from the DRAM 1100. The master SSD 4000 may distribute the commands to respective slave SSDs based on a determined RAID level. More specifically, the master SSD 4000 may transfer the commands respectively corresponding to the first slave SSD 5100, the second slave SSD 5200, and the third slave SSD 5300 to the first slave SSD 5100, the second slave SSD 5200, and the third slave SSD 5300 in a one-to-one manner. In addition, each of the master SSD 4000, the first slave SSD 5100, the second slave SSD 5200, and the third slave SSD 5300 may perform a read operation corresponding to the command processing request.

More specifically, each of the master SSD 4000, the first slave SSD 5100, the second slave SSD 5200, and the third slave SSD 5300 may transmit data corresponding to each of the master SSD 4000, the first slave SSD 5100, the second slave SSD 5200, and the third slave SSD 5300 to the DRAM 1100 based on the commands. Each of the master SSD 4000, the first slave SSD 5100, the second slave SSD 5200, and the third slave SSD 5300 may transmit data, which is read, to the DRAM 1100. For example, the master SSD 4000, the first slave SSD 5100, the second slave SSD 5200, and the third slave SSD 5300 may transmit pieces of data respectively corresponding to the master SSD 4000, the first slave SSD 5100, the second slave SSD 5200, and the third slave SSD 5300 among pieces of data striped according to the RAID level 0. In addition, the first slave SSD 5100, the second slave SSD 5200, and the third slave SSD 5300 may notify completion of operations corresponding to the received commands to the master SSD 4000. When the operations of the master SSD 4000, the first slave SSD 5100, the second slave SSD 5200, and the third slave SSD 5300 are completed, the master SSD 4000 may notify completion of the operations to the host device 1000. More specifically, the master SSD 4000 may transmit a complete queue (CQ) to the host device 1000. In the CQ, completion information about a command requested from the host device 1000 may be stored.

In FIGS. 19 and 20, by way of example, the operation of the storage system 20000 is described according to the RAID level 0. However, a RAID level is not limited to the RAID level 0.

More specifically, for example, when the operation of the storage system 20000 is performed according to the RAID level 1, a read operation of the storage system 20000 may be performed in the same manner as that according to the RAID level 0. However, in a write operation, the master SSD 4000, the first slave SSD 5100, the second slave SSD 5200, and the third slave SSD 5300 may store the same data.

For example, when the operation of the storage system 20000 is performed according to the RAID level 4, the master SSD 4000 may calculate and store a parity. In a write operation, each slave SSD 5000 may store data received from the DRAM 1100, and each slave SSD 5000 may transmit the stored data to the master SSD 4000. In addition, the master SSD 4000 may perform a parity calculation using the data received from the slave SSDs 5000, and may store a parity. In a read operation, each slave SSD 5000 may also transmit, to the master SSD 4000, the data that is to be transmitted to the DRAM 1100. In addition, the master SSD 4000 may perform a parity calculation and an error correction on the data received from the slave SSDs 5000.

For example, when the operation of the storage system 20000 is performed according to the RAID level 5 or the RAID level 6, the master SSD 4000 and the slave SSDs 5000 may serve as devices storing parities and may transmit data for a parity calculation regardless of roles as the master SSD 4000 and the slave SSD 5000. A parity check calculation of the RAID level 4 may be performed by any of the master SSD 4000 and the slave SSD 5000 regardless of their roles.

In addition, according to an embodiment of the present disclosure, the master SSD 4000 may serve as the raid controller 1800, described in FIG. 1 and FIGS. 4 to 11. According to the embodiment of the present disclosure, the master SSD 4000 may perform RAID-coupling the master SSD 4000 and the plurality of slave SSDs 5100, 5200 and 5300 having different capacities by allocating capacities to respective functions of the master and slave SSDs 4000, 5100, 5200 and 5300 based on the greatest common divisor of the capacities of the master and slave SSDs 4000, 5100, 5200 and 5300. The function may refer to a physical function (PF) between the physical function (PF) and a virtual function (VF).

Figure 21:
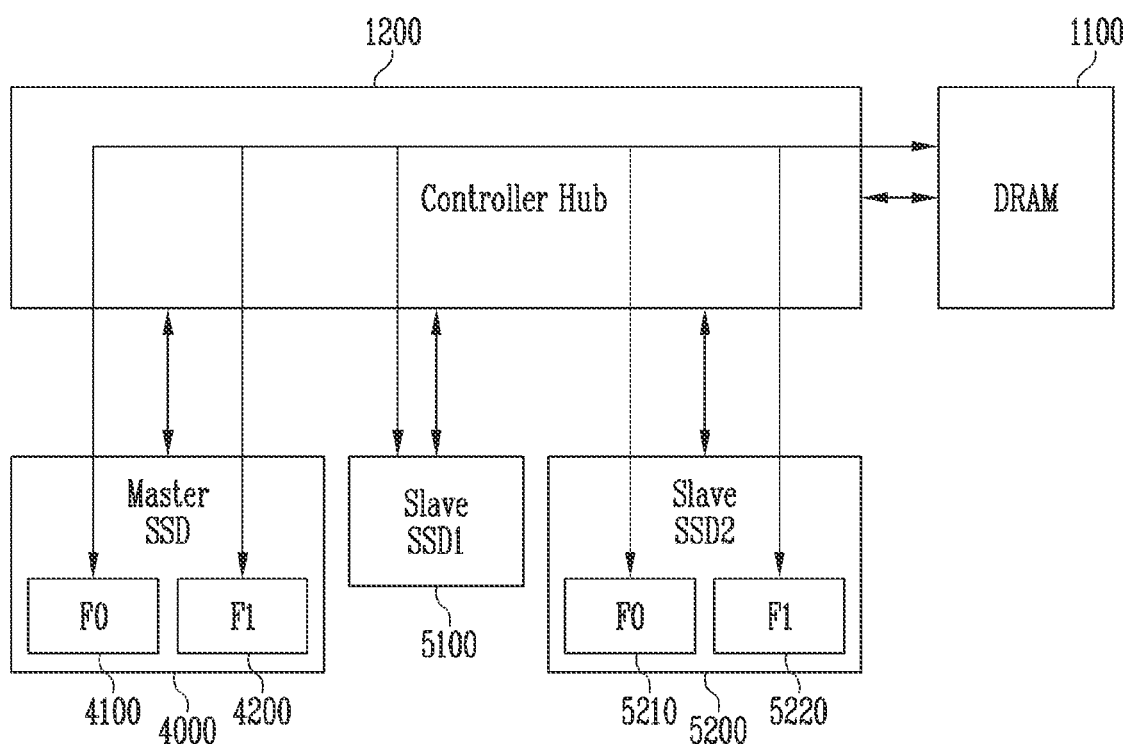
FIG. 21 is a diagram illustrating an operation of a storage system including a plurality of functions according to an embodiment of the present disclosure.

FIG. 21 is a diagram illustrating an operation of a storage system including a plurality of functions according to an embodiment of the present disclosure.

Referring to FIG. 21, each of the master SSD 4000 and the second slave SSD 5200 may include a plurality of functions.

The function may be a unit of individual operation for providing physical resources included in a storage device. More specifically, the master SSD 4000 may include the function F0 4100 and the function F1 4200 and the second slave SSD 5200 may include a function F0 5210 and a function F1 5220. Each of the functions is a unit of individual operation. Therefore, although including three physical SSDs, that is, the master SSD 4000, the first slave SSD 5100, and the second slave SSD 5200, the storage system 20000 may be implemented to have five functional SSDs.

According to an embodiment, the function F0 4100 included in the master SSD 4000 may serve as the master SSD 4000 described above with reference to FIGS. 19 and 20. In addition, the function F1 4200 included in the master SSD 4000, the first slave SSD 5100, and the function F0 5210 and the function F1 5220 included in the second slave SSD 5200 may serve as the slaves SSD 5000 described above with reference to FIGS. 19 and 20.

Figure 22:
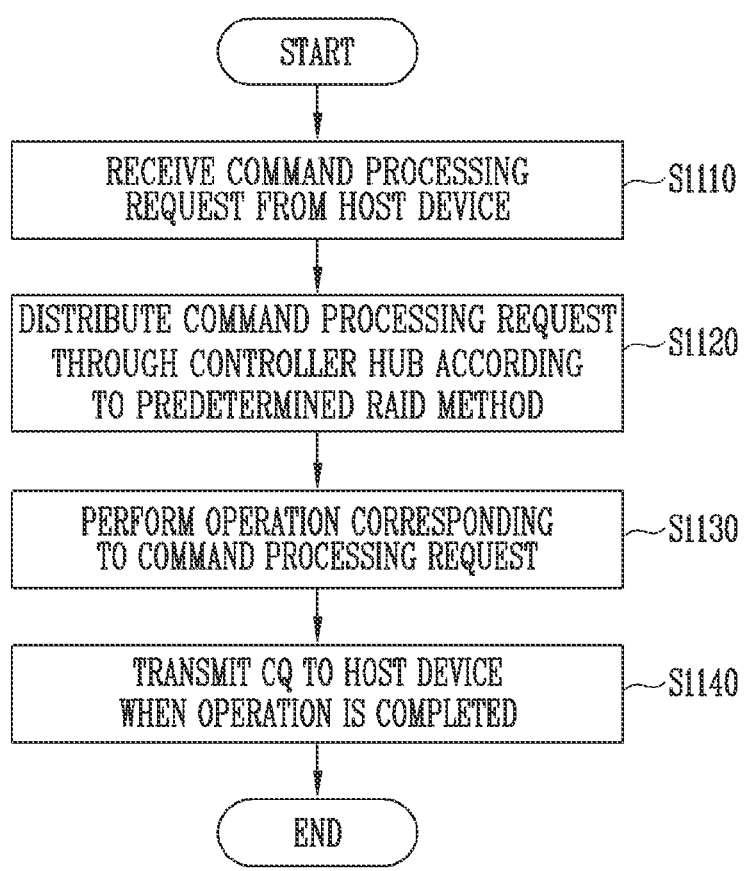
FIG. 22 is a diagram illustrating a method of operating a storage system according to an embodiment of the present disclosure.

FIG. 22 is a diagram illustrating a method of operating a storage system according to an embodiment of the present disclosure.

The storage system 20000 may include a master storage device, a slave storage device, and a controller hub coupling the master storage device to the slave storage device. The master storage device and the slave storage device may be solid state drives (SSDs). The controller hub may be a root complex supporting a protocol according to Peripheral Component Interconnect Express (PCIe). The storage system 20000 may receive a command processing request from a host device (S1110). The host device may provide the command processing request to the master storage device by using host memory.

The storage system 20000 may distribute the command processing request through the controller hub according to a predetermined RAID scheme (S1120). More specifically, the master storage device may distribute a command to the slave storage device corresponding to the received command according to a predetermined RAID level or the predetermined RAID scheme.

The storage system 20000 may perform an operation corresponding to the command processing request (S1130). The operation corresponding to the command processing request may be a write operation for storing data or a read operation for reading the stored data according to the predetermined RAID scheme. When the operation corresponding to the command processing request is completed, the storage system 20000 may transmit a complete queue (CQ) to the host device (S1140).

The storage system 20000 might not include a separate RAID controller which supports a RAID scheme; instead, an SSD in the storage system 20000 may be used to perform a function of a RAID controller. A function of the SSD may replace a function of a RAID controller by using Peer-to-Peer (P2P) routing without a separate RAID controller or hardware device being further included in the storage system 20000.

According to embodiments of the present disclosure, a storage system 20000 capable of storing data according to a RAID method without a separate RAID controller and a method of operating the storage system may be provided.

What is claimed is:

1. A storage system, comprising:
 a master storage device configured to store data based on a RAID level determined by a host;
 a slave storage device configured to communicate with the master storage device, and to store the data according to a command distributed from the master storage device; and
 a switch configured to route the command or the data between the master storage device and the slave storage device,
 wherein the master storage device is further configured to determine a number of functions to be allocated to each of the master storage device and the slave storage device based on a reference capacity.

2. The storage system of claim 1,
 wherein the master storage device is further configured to:
 transfer the command to the slave storage device when the master storage device receives a command processing request from the host.

3. The storage system of claim 1,
 wherein the master storage device is further configured to:
 request a host to allocate a capacity to each function in the master storage device and the slave storage device based on a reference capacity.

4. The storage system of claim 2,
 wherein the command processing request includes a read request for reading the data stored in the master or slave storage devices.

5. The storage system of claim 4,
 wherein the master storage device is further configured to read therefrom one or more pieces of the data corresponding to the read request and to transmit the pieces read from the master storage device to the host.

6. The storage system of claim 4,
 wherein the slave storage device is further configured to read therefrom one or more pieces of the data corresponding to the read request and to transmit the pieces read from the slave storage device to the host.

7. The storage system of claim 2,
 wherein the command processing request includes a write request for storing the data into the master or slave storage devices.

8. The storage system of claim 7,
 wherein the master storage device is further configured to receive one or more pieces of the data corresponding to the write request from the host, and to store therein the pieces received from the host.

9. The storage system of claim 7,
 wherein the slave storage device is further configured to receive one or more pieces of the data corresponding to the write request from the host, and to store therein the pieces received from the host.

10. The storage system of claim 1,
 wherein the master storage device is further configured to:
 receive, from the slave storage device, pieces of size information indicating capacities of the slave storage device.

11. The storage system of claim 10,
 wherein the master storage device is further configured to:
 set, as a reference capacity, a common divisor of the capacities of the master storage device and the slave storage device based on the received pieces of size information.

12. The storage system of claim 1, wherein the master storage device RAID-couples functions, divided according to the number of functions allocated to each of the master storage device and the slave storage device.

13. The storage system of claim 12, wherein the master storage device is further configured to control the slave storage device to maintain the functions, divided according to the number of functions until a RAID-coupling is initialized.

14. The storage system of claim 1, wherein the master storage device is further configured to:
output, to the host, allocation information indicating the number of the functions to be allocated to each of the master storage device and the slave storage device.

15. The storage system of claim 1, wherein the master storage device is further configured to:
transfer, from the host to the slave storage device by a predetermined method, function information allocating the number of functions to the slave storage device.

16. The storage system of claim 1, wherein, when the slave storage device does not support a predetermined method, the master storage device is further configured to set, as a reference capacity, a capacity of the slave storage device that does not support the predetermined method.

17. The storage system of claim 1, wherein the switch is configured to route the command or the data based on information in a packet including the command or the data.

* * * * *